(12) United States Patent
Ross, Jr. et al.

(10) Patent No.: US 7,726,334 B2
(45) Date of Patent: Jun. 1, 2010

(54) SERVICE VALVE ASSEMBLY HAVING A STOP-FILL DEVICE AND REMOTE LIQUID LEVEL INDICATOR

(75) Inventors: Herbert G. Ross, Jr., Argyle, TX (US); Danny E. Swindler, Prosper, TX (US)

(73) Assignee: Rochester Gauges, Inc., Dallas, TX (US)

( * ) Notice: Subject to any disclaimer, the term of this patent is extended or adjusted under 35 U.S.C. 154(b) by 282 days.

(21) Appl. No.: 11/840,915

(22) Filed: Aug. 17, 2007

(65) Prior Publication Data

US 2008/0035213 A1    Feb. 14, 2008

Related U.S. Application Data

(63) Continuation-in-part of application No. 11/023,664, filed on Dec. 28, 2004, now Pat. No. 7,293,578.

(60) Provisional application No. 60/538,279, filed on Jan. 22, 2004, provisional application No. 60/572,143, filed on May 18, 2004, provisional application No. 60/822,926, filed on Aug. 18, 2006, provisional application No. 60/822,921, filed on Aug. 18, 2006, provisional application No. 60/822,928, filed on Aug. 19, 2006.

(51) Int. Cl.
*F16K 31/18* (2006.01)

(52) U.S. Cl. .................... 137/447; 137/558; 141/198; 73/317

(58) Field of Classification Search ............. 137/2, 137/198, 425, 434, 446, 447, 558; 141/198; 73/306, 309, 311, 317; 222/51
See application file for complete search history.

(56) References Cited

U.S. PATENT DOCUMENTS 23,816 A    5/1859    Andrews et al.

(Continued)

FOREIGN PATENT DOCUMENTS

CN    1346963 A1    5/2002

(Continued)

OTHER PUBLICATIONS

Rochester Gauges, Inc., Rochester Industrial Level Gauges Brochure, Aug. 1993, 12 pages.

(Continued)

*Primary Examiner*—John Rivell
*Assistant Examiner*—Craig Price
(74) *Attorney, Agent, or Firm*—Howison & Arnott, L.L.P.

(57) ABSTRACT

A system for determining a fluid level in a pressurizable container comprising is disclosed. The system includes a service valve having a set of wrench flats defining parallel flat surfaces, one of the wrench flats having a recess defined entirely within its flat surface, a stop-fill device interconnected with the service valve and operable to rotate a first magnet inside the service valve in proximity to the recess in proportion to the amount of fluid in the pressurizable container, and a dial assembly having a dial face and a pointer attached to a second magnet, the second magnet housed in a magnet protrusion on a side of the dial face opposite the pointer and operable to fit into the recess in the service valve such that the dial moves on the dial face proportionately to the degree of rotation of the first magnet inside the service valve. In one variation, a sensor placed in the recess or adjacent a throat of the service valve is electrically connected to a remotely located gauge for displaying a reading corresponding to the level of fluid in the container.

20 Claims, 27 Drawing Sheets

U.S. PATENT DOCUMENTS

| | | | |
|---|---|---|---|
| 204,630 A | 6/1878 | Starkey et al. |
| 251,283 A | 12/1881 | Quinn |
| 447,129 A | 2/1891 | Cooper |
| 521,350 A | 6/1894 | Turner |
| 609,629 A | 8/1898 | Robinson |
| 691,400 A | 1/1902 | Marscher |
| 755,827 A | 3/1904 | Yates et al. |
| 1,141,499 A | 6/1915 | Stahle |
| 1,141,926 A | 6/1915 | Bolin et al. |
| 1,285,570 A | 11/1918 | Schnaier |
| 1,304,022 A | 5/1919 | Cole |
| 1,316,341 A | 9/1919 | Vosika |
| 1,423,411 A | 7/1922 | Finch |
| 1,448,842 A | 3/1923 | Gregory |
| 1,603,239 A | 10/1926 | Gregory |
| 1,617,819 A | 2/1927 | Mabie |
| 1,634,165 A | 7/1927 | Williams |
| 1,648,731 A * | 11/1927 | Hower et al. ............ 73/317 |
| 1,822,735 A | 9/1931 | Hastings |
| 1,899,119 A | 2/1933 | Singer |
| 1,937,231 A | 11/1933 | Klein |
| 2,198,055 A | 4/1940 | Liner |
| 2,311,387 A | 2/1943 | Hastings |
| 2,500,348 A | 3/1950 | De Giers et al. |
| 2,551,792 A | 5/1951 | De Giers et al. |
| 2,578,104 A | 12/1951 | Taylor |
| 2,584,446 A | 2/1952 | Hastings et al. |
| D172,372 S | 6/1954 | Wagner |
| 2,697,350 A | 12/1954 | Sorber |
| 2,705,970 A | 4/1955 | Orelind, et al. |
| 2,795,955 A | 6/1957 | Hall |
| 2,799,348 A | 7/1957 | Page |
| 2,836,144 A | 5/1958 | Morphis |
| D187,084 S | 1/1960 | Gugliotta |
| 2,992,560 A | 7/1961 | Morgan et al. |
| 3,012,437 A | 12/1961 | Clark et al. |
| D196,808 S | 11/1963 | Hoff |
| 3,112,464 A | 11/1963 | Ratajski et al. |
| 3,132,331 A | 5/1964 | Boddy |
| 3,256,907 A | 6/1966 | Clark et al. |
| 3,320,806 A | 5/1967 | Johnson et al. |
| 3,320,813 A | 5/1967 | Taylor et al. |
| 3,320,922 A | 5/1967 | Taylor et al. |
| 3,320,923 A | 5/1967 | Taylor et al. |
| 3,339,519 A | 9/1967 | Taylor et al. |
| 3,351,821 A | 11/1967 | Blackett |
| 3,364,321 A | 1/1968 | Gessner |
| D213,192 S | 1/1969 | Hastings |
| 3,463,843 A | 8/1969 | Taylor et al. |
| 3,681,753 A | 8/1972 | Whalen et al. |
| 3,688,795 A | 9/1972 | Taylor |
| 3,703,246 A | 11/1972 | Horak |
| 3,709,038 A | 1/1973 | Werner |
| 3,710,612 A | 1/1973 | Innes et al. |
| 3,739,641 A | 6/1973 | Taylor et al. |
| 3,742,243 A | 6/1973 | Gamble |
| 3,777,273 A | 12/1973 | Baba et al. |
| 3,806,851 A | 4/1974 | McCormick |
| 3,826,139 A | 7/1974 | Bachman |
| D233,569 S | 11/1974 | Miller |
| D233,836 S | 12/1974 | Raffler et al. |
| 3,859,651 A | 1/1975 | Thomas, Jr. |
| 3,901,079 A | 8/1975 | Vogel |
| D240,227 S | 6/1976 | Flynn |
| 3,965,454 A | 6/1976 | Puerner |
| 3,986,109 A | 10/1976 | Poduje |
| 4,064,907 A | 12/1977 | Billington et al. |
| 4,086,533 A | 4/1978 | Ricouard et al. |
| 4,102,191 A | 7/1978 | Harris |
| 4,107,998 A | 8/1978 | Taylor |
| 4,114,130 A | 9/1978 | Sutton et al. |
| 4,125,821 A | 11/1978 | Masuda |
| 4,155,340 A | 5/1979 | Fernquist et al. |
| 4,223,190 A | 9/1980 | Olson |
| 4,293,837 A | 10/1981 | Jaffe et al. |
| 4,355,363 A | 10/1982 | Colby et al. |
| 4,362,056 A | 12/1982 | Lee |
| 4,383,444 A | 5/1983 | Beaman et al. |
| 4,387,334 A | 6/1983 | Loper |
| 4,392,375 A | 7/1983 | Eguchi et al. |
| 4,395,695 A | 7/1983 | Nakamura |
| 4,402,209 A | 9/1983 | Di Domenico |
| 4,416,211 A | 11/1983 | Hoffman |
| 4,417,473 A | 11/1983 | Tward et al. |
| 4,418,340 A | 11/1983 | Maeshiba |
| 4,425,557 A | 1/1984 | Nakamura |
| 4,430,634 A | 2/1984 | Hufford et al. |
| 4,441,364 A | 4/1984 | Montie |
| 4,480,469 A | 11/1984 | Tice |
| 4,483,367 A | 11/1984 | Ross, Jr. et al. |
| 4,507,961 A | 4/1985 | Stradella |
| 4,532,491 A | 7/1985 | Rau et al. |
| 4,543,730 A | 10/1985 | Scott |
| 4,545,020 A | 10/1985 | Brasfield |
| 4,567,763 A | 2/1986 | Schiffbauer |
| 4,570,118 A | 2/1986 | Tomczak et al. |
| 4,575,929 A | 3/1986 | Bleeke |
| 4,580,450 A | 4/1986 | Ota et al. |
| 4,589,077 A | 5/1986 | Pope |
| 4,590,575 A | 5/1986 | Emplit |
| 4,595,301 A | 6/1986 | Taylor |
| D285,332 S | 8/1986 | Trinkwalder |
| 4,605,038 A | 8/1986 | Tchitdjian |
| 4,610,165 A | 9/1986 | Duffy et al. |
| 4,617,512 A | 10/1986 | Horner |
| 4,635,480 A | 1/1987 | Hrncir et al. |
| 4,641,122 A | 2/1987 | Hennequin |
| 4,667,711 A | 5/1987 | Draft |
| 4,671,121 A | 6/1987 | Schieler |
| 4,688,028 A | 8/1987 | Conn |
| 4,688,587 A | 8/1987 | Bourgeon |
| 4,703,261 A | 10/1987 | Berchtold |
| 4,709,225 A | 11/1987 | Welland et al. |
| 4,719,419 A | 1/1988 | Dawley |
| 4,731,730 A | 3/1988 | Hedrick et al. |
| 4,782,215 A | 11/1988 | Kadwell et al. |
| 4,796,469 A | 1/1989 | Brown et al. |
| 4,806,847 A | 2/1989 | Atherton et al. |
| 4,812,804 A | 3/1989 | Masaki |
| 4,825,070 A | 4/1989 | Arimura |
| 4,835,509 A | 5/1989 | Yoshino et al. |
| 4,841,771 A | 6/1989 | Glover et al. |
| 4,864,273 A | 9/1989 | Tsuzuki et al. |
| 4,911,011 A | 3/1990 | Fekete et al. |
| 4,922,081 A | 5/1990 | Kadwell et al. |
| 4,924,704 A | 5/1990 | Gaston |
| 4,928,526 A | 5/1990 | Weaver |
| 4,931,764 A | 6/1990 | Gaston |
| 4,939,932 A | 7/1990 | Ritzenthaler et al. |
| 4,943,791 A | 7/1990 | Holce et al. |
| D311,572 S | 10/1990 | Burns |
| 4,967,181 A | 10/1990 | Iizuka et al. |
| D313,949 S | 1/1991 | Fekete |
| 4,987,400 A | 1/1991 | Fekete |
| 4,991,436 A | 2/1991 | Roling |
| 5,023,806 A | 6/1991 | Patel |
| 5,027,871 A | 7/1991 | Guenther |
| 5,050,433 A | 9/1991 | Lumetta |
| 5,051,921 A | 9/1991 | Paglione |
| D320,842 S | 10/1991 | Roman |
| 5,055,781 A | 10/1991 | Sakakibara et al. |
| 5,072,618 A | 12/1991 | Taylor et al. |
| 5,085,078 A | 2/1992 | Baux et al. |
| 5,092,230 A | 3/1992 | Bronnert |

| | | | | | | |
|---|---|---|---|---|---|---|
| 5,103,368 | A | 4/1992 | Hart | D440,994 S | 4/2001 | Ross, Jr. |
| 5,117,693 | A | 6/1992 | Duksa | 6,220,096 B1 | 4/2001 | Gutierrez et al. |
| 5,121,109 | A | 6/1992 | Murphy, Jr. et al. | 6,253,611 B1 | 7/2001 | Varga et al. |
| 5,140,303 | A | 8/1992 | Meyer | 6,265,883 B1 | 7/2001 | Clark |
| 5,152,170 | A | 10/1992 | Liu | 6,305,220 B1 | 10/2001 | Brunel |
| 5,159,268 | A | 10/1992 | Wu | 6,312,074 B1 | 11/2001 | Walker |
| 5,164,668 | A | 11/1992 | Alfors | 6,380,750 B1 | 4/2002 | Schenck, Jr. et al. |
| 5,191,284 | A | 3/1993 | Morettis et al. | 6,443,006 B1 | 9/2002 | DeGrave |
| 5,216,919 | A | 6/1993 | Nelson et al. | 6,479,981 B2 | 11/2002 | Schweitzer et al. |
| 5,265,032 | A | 11/1993 | Patel | 6,497,145 B1 * | 12/2002 | Ross, Jr. ............... 73/317 |
| 5,270,645 | A | 12/1993 | Wheeler et al. | 6,523,406 B2 | 2/2003 | Housey et al. |
| 5,272,918 | A | 12/1993 | Gaston et al. | 6,530,293 B1 | 3/2003 | Ruckert et al. |
| 5,294,917 | A * | 3/1994 | Wilkins ............... 73/317 | 6,564,632 B2 | 5/2003 | Ross, Jr. |
| 5,300,883 | A | 4/1994 | Richeson | 6,584,838 B2 | 7/2003 | Lorenzen |
| 5,305,639 | A | 4/1994 | Pontefract | 6,614,242 B2 | 9/2003 | Matter et al. |
| 5,311,776 | A | 5/1994 | Morris | 6,675,648 B2 | 1/2004 | Housey et al. |
| RE34,679 | E | 8/1994 | Ritzenthaler et al. | 6,679,116 B2 | 1/2004 | Ross, Jr. |
| 5,333,499 | A | 8/1994 | Gaston | 6,724,201 B2 | 4/2004 | Sato et al. |
| 5,341,679 | A | 8/1994 | Walkowski et al. | 6,762,679 B1 | 7/2004 | Diaz |
| D350,297 | S | 9/1994 | Weisel | D519,049 S | 4/2006 | Kim |
| 5,351,387 | A | 10/1994 | Iwata et al. | D538,693 S | 3/2007 | Ross et al. |
| 5,357,815 | A | 10/1994 | Williamson | D539,685 S | 4/2007 | Ross et al. |
| 5,375,467 | A | 12/1994 | Banse | 7,219,686 B2 | 5/2007 | Schmitz et al. |
| 5,438,869 | A | 8/1995 | Mueller et al. | 7,293,578 B2 | 11/2007 | Swindler et al. |
| 5,444,369 | A | 8/1995 | Luetzow | 2004/0154393 A1 | 8/2004 | Taylor et al. |
| 5,463,314 | A | 10/1995 | Mueller et al. | 2006/0169325 A1 * | 8/2006 | Schmitz et al. ............. 137/413 |
| D363,888 | S | 11/1995 | Williamson | | | |
| 5,479,820 | A | 1/1996 | Fekete | | | |
| 5,570,118 | A | 10/1996 | Rezanka et al. | | | |
| D378,284 | S | 3/1997 | Grilk et al. | | | |
| 5,608,386 | A | 3/1997 | Murphy, III et al. | | | |
| D379,316 | S | 5/1997 | Williamson | | | |
| 5,670,876 | A | 9/1997 | Dilger et al. | | | |
| 5,672,818 | A | 9/1997 | Schaefer et al. | | | |
| D386,997 | S | 12/1997 | Williamson | | | |
| D387,295 | S | 12/1997 | Krikorian | | | |
| 5,701,932 | A | 12/1997 | Bourscheid et al. | | | |
| 5,712,561 | A | 1/1998 | McCurley et al. | | | |
| 5,743,136 | A | 4/1998 | Gaston et al. | | | |
| 5,746,088 | A | 5/1998 | Sawert et al. | | | |
| 5,756,876 | A | 5/1998 | Wetzel et al. | | | |
| 5,757,179 | A | 5/1998 | McCurley et al. | | | |
| 5,765,434 | A | 6/1998 | Harbaugh | | | |
| D397,306 | S | 8/1998 | Ross, Jr. | | | |
| 5,790,422 | A | 8/1998 | Power et al. | | | |
| 5,798,639 | A | 8/1998 | McCurley et al. | | | |
| D397,630 | S | 9/1998 | Clifton | | | |
| D397,631 | S | 9/1998 | Riegel | | | |
| 5,800,221 | A | 9/1998 | Dombrowski et al. | | | |
| D399,444 | S | 10/1998 | Ross, Jr. | | | |
| 5,838,241 | A | 11/1998 | Lease et al. | | | |
| D402,220 | S | 12/1998 | Clifton | | | |
| 5,850,142 | A | 12/1998 | Rountos et al. | | | |
| 5,936,613 | A | 8/1999 | Jaeger et al. | | | |
| D413,826 | S | 9/1999 | Housey | | | |
| 5,955,881 | A | 9/1999 | White et al. | | | |
| 5,959,525 | A | 9/1999 | Black et al. | | | |
| D414,711 | S | 10/1999 | Hrncir | | | |
| 5,963,124 | A | 10/1999 | Buss et al. | | | |
| 5,982,170 | A | 11/1999 | McCurley et al. | | | |
| 5,998,892 | A | 12/1999 | Smith et al. | | | |
| D419,091 | S | 1/2000 | Pattison et al. | | | |
| 6,016,697 | A | 1/2000 | McCulloch et al. | | | |
| 6,018,241 | A | 1/2000 | White et al. | | | |
| 6,040,756 | A | 3/2000 | Kaijala | | | |
| 6,041,650 | A | 3/2000 | Swindler et al. | | | |
| 6,064,197 | A | 5/2000 | Lochmann et al. | | | |
| 6,089,086 | A | 7/2000 | Swindler | | | |
| D430,050 | S | 8/2000 | Housey et al. | | | |
| 6,101,873 | A | 8/2000 | Kawakatsu et al. | | | |
| D431,483 | S | 10/2000 | Housey | | | |
| 6,127,916 | A | 10/2000 | Cooper et al. | | | |
| D440,925 | S | 4/2001 | Pfeiffer | | | |

FOREIGN PATENT DOCUMENTS

| | | |
|---|---|---|
| DE | 43 00 383 A1 | 7/1994 |
| DE | 197 46 276 A1 | 4/1999 |
| DE | 197 54 521 A1 | 6/1999 |
| EP | 0 101 580 A1 | 2/1984 |
| EP | 0578299 A1 | 1/1994 |
| EP | 0593085 A1 | 4/1994 |
| EP | 0 895 068 A2 | 3/1999 |
| FR | 2 661 498 A1 | 10/1991 |
| GB | 1177805 A | 3/1967 |
| GB | 1 380 031 A | 5/1973 |
| GB | 2 043 259 A | 11/1979 |
| WO | 01/79789 A2 | 10/2001 |
| WO | 01/79789 A3 | 10/2001 |

OTHER PUBLICATIONS

Rochester Gauges, Inc., Ez-Read TwineSite.TM. Sender Installation/Conversion Technical Data Sheet DS-923, Date Not Known, 4 pages.
Rochester Gauges, Inc., Senior Ez-Read TwinSite.TM. Sender for Industrial Service Technical Data Sheet TS002, Mar. 25, 1994, 2 pages.
Rochester Gauges, Inc., "Junior.RTM. EZ-Read TwinSite.TM. Two-Terminal Sender," May 27, 1992, 2 pages.
Rochester Gauges, Inc., Junior Ez-Read TwinSite.TM. Sender for Industrial Service Technical Data Sheet TS003, Mar. 25, 1994, 2 pages.
Rochester Gauges, Inc. Voltage-Divider TwinSite.TM. Sender Technical Data Sheet VD001, Jan. 21, 1994, 2 pages.
Rochester Gauges, Inc., TwinSite.TM. Switch Technical Data Sheet VD002, Jan. 21, 1994, 2 pages.
Rochester Gauges, Inc., Magnetic Liquid-Level Gauges for LP-Gas Service, 7300 Series, Technical Data Sheet, Date Not Known, 2 pages.
Rochester Gauges, Inc., "The One Gauge, Adjustable Liquid Level Gauge", Technical Data Sheet 49S, Date Not Known, 2 pages.
Rochester Gauges, Inc., "Magnetic Liquid Level Gauges for L.P. Gas Service", Technical Data Sheet 7200/B7200, May 27, 1992, 2 pages.
Rochester Gauges, Inc., Rochester Industrial Level Gauges Brochure, Aug. 1993, (excerpt) 1 page.
Rochester Gauges, Inc., A6200 Series (Brochure), Date Not Known, 1 page.
C-Level Gauges (Brochure), Rochester Gauges, Inc., Date Not Known, 2 pages.
Rochester Gauges, Inc., Rough Rider Advertisement, Date Not Known, 1 page.

Rochester Gauges, Inc., Drawing No. M6339-11, Mar. 12, 1973, 1 page.

Lemoff, Thomas C., P.E., "Liquified Petroleum Gases Handbook", Fourth Edition, National Fire Protection Association, Quincy, MA, 1995, 9 pages.

"Series 353 Sensor Brings New Accuracy to Fuel Gauges", CTS Corp., Internet Article: http://www.ctscorp.com/techtalk/issue4/fuelgauge.htm, Nov. 11, 2000, 2 pages.

PCT: International Search Report of PCT/US99/14059; International Publication No. WO 2000/002015; Jul. 18, 2000; 2 pgs.

PCT: International Search Report of PCT/US07/76256; International Publication No. WO 2008/022340; Sep. 19, 2008; 1 pg.

PCT: Written Opinion of the International Searching Authority of PCT/US07/76256; International Publication No. WO 2008/022340; Sep. 19, 2008; 5 pgs.

PCT: International Search Report of PCT/US00/07668; International Publication No. WO 2000/060321; Jul. 24, 2000; 3 pgs.

* cited by examiner

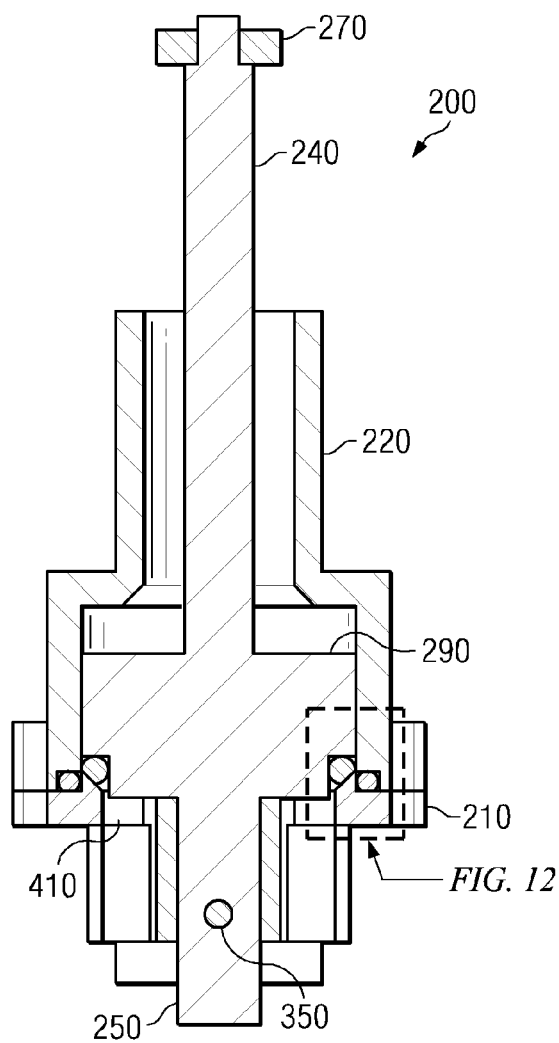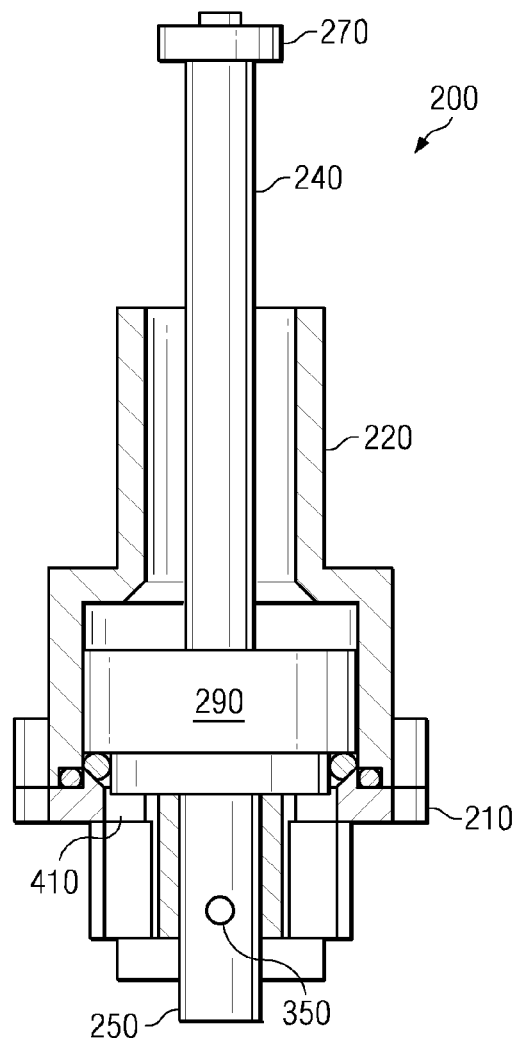
*FIG. 10*
*FIG. 10A*

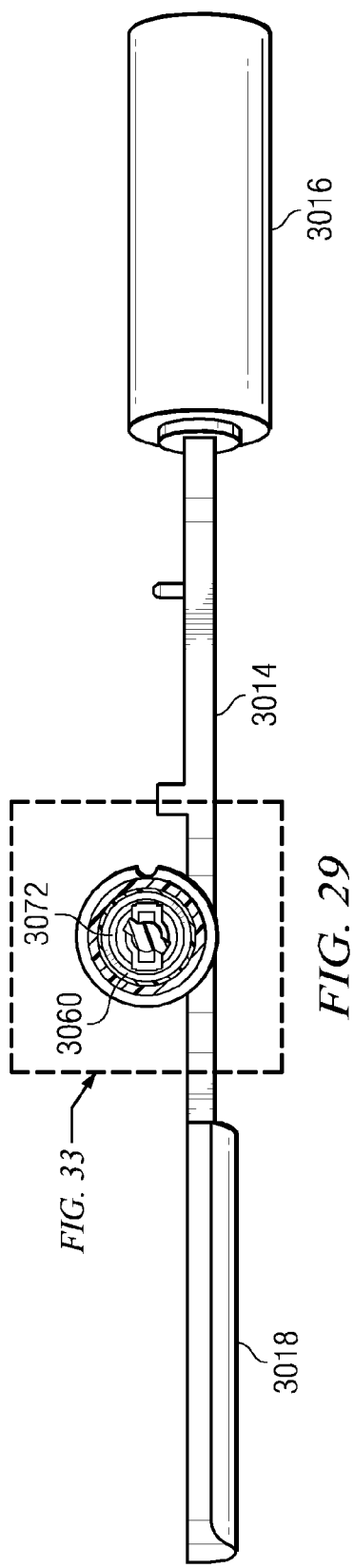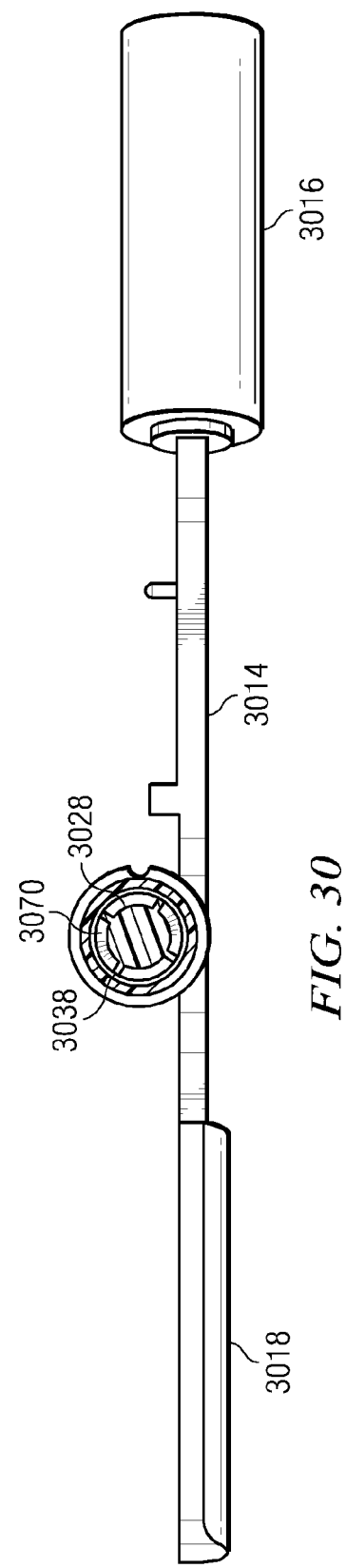

SERVICE VALVE ASSEMBLY HAVING A STOP-FILL DEVICE AND REMOTE LIQUID LEVEL INDICATOR

CROSS-REFERENCE TO RELATED APPLICATIONS

This application is a continuation-in-part of U.S. patent application Ser. No. 11/023,664 entitled Gauge Assembly Having a Stop-fill Valve, filed Dec. 28, 2004 which claims the benefit of U.S. Provisional Application No. 60/538,279, entitled "Gauge Assembly", filed on Jan. 22, 2004 and U.S. Provisional Application No. 60/572,143, entitled "Gauge Assembly Having a Stop-fill Device", filed on May 18, 2004, the disclosures of which are incorporated herein by reference. This application also claims the benefit of U.S. Provisional Application Ser. No. 60/822,926, entitled "Service Valve Assembly Having a Stop-fill Device and Magnetic Liquid Level Indicator," filed Aug. 18, 2006, U.S. Provisional Application Ser. No. 60/822,921 entitled "Gauge Assembly having a Stop-Fill Device and a Liquid Level Indicator," filed Aug. 18, 2006 and U.S. Provisional Application Ser. No. 60/822,928, entitled "Gauge Assembly Having a Stop-Fill Device and a Liquid Level Indicating Dial" filed Aug. 19, 2006, the disclosures of which are incorporated herein by reference.

TECHNICAL FIELD

This disclosure relates to a device capable of providing an indication of a fluid level in a tank and capable of transitioning a tank inlet between a state where fluid-flow is prevented and a state where fluid-flow is allowed.

BACKGROUND

There are many different types of containers, tanks, vessels, and canisters that are used for storing fluids. For convenience, this document will use the term "tank" throughout to refer to what could be any kind of container, vessel, canister, tank, or the like.

It is often desirable to allow for monitoring of the fluid level in a tank, particularly in cases where the tank is such that the fluid cannot conveniently be visually inspected. For this reason, many tanks are provided with devices for communicating a fluid level, for example through the use of a fluid-level gauge that can provide an indication of the amount of fluid present in a tank. There are many known examples of fluid level gauges that use a float or a capacitance to mechanically and/or electrically drive an indicator.

It is also desirable in some cases to provide a stop-fill device for preventing a tank from being over-filled. Known stop-fill devices include those intended to be used in tanks that require a fluid to pass through an inlet valve in order to enter the tank. Typically such stop-fill devices include a float that rides on the surface of the fluid in the tank. As fluid is added to the tank, the float rises to a certain level at which point it causes, for example by releasing a spring, the inlet valve to close. Once the inlet valve is closed, no additional fluid can be added to the tank.

It is further desirable in some cases to allow the indicating dial of the level gauge to be removable from the tank-valve assembly. For example, tanks are commonly traded-in for refilling, and the owner returning an empty tank may wish to remove the dial and use it on the newly filled tank. In other cases, the dial may be removed to prevent damage during storage or refilling.

SUMMARY

The disclosure provides a single assembly capable of serving as a fluid-level gauge, a stop-fill device, or a combination of both. Included is a rotary function for both driving a dial and/or for activating a valve, thus reducing cost and number of parts, as well as providing a simplified operation.

According to one feature, a gauge assembly is provided that comprises a shaft that rotates according to a change in fluid level, an indicator for providing an indication of the fluid level based on a rotational position of the shaft, and a stop-fill assembly for transitioning between an open configuration and a closed configuration based on the rotational position of the shaft.

The stop-fill assembly can include a valve shuttle that rotates in conjunction with the rotation of the shaft and moves between an open position corresponding with said open configuration and a closed position corresponding with said closed configuration based on the rotational position of the shaft. The valve shuttle can include a flow surface at an angle to the direction of fluid flow when fluid is flowing into the tank such that the pressure of fluid flowing across the flow surface assists in rotating the valve shuttle from the open position to the closed position. The stop-fill assembly is designed taking into consideration the controlling pressure zones throughout the flow path. The flow surface in one embodiment may have two or more vanes for the purpose of imparting rotational force to the stop-fill assembly. The stop-fill assembly can include a valve body having a release slot, and the valve shuttle can have a retaining rib that engages with the release slot when the stop-fill assembly is in the closed configuration. The valve shuttle can have an upper shaft, and the gauge assembly can further comprise an indicator driving member for coupling with the indicator in order to translate a rotational position of the upper shaft into a fluid level. The valve shuttle can include a blocking member that blocks fluid flow when the valve shuttle is in the closed position.

According to another aspect, a method of gauging and controlling fluid flow is provided that comprises the steps of rotating a shaft as fluid level in a tank changes, translating a rotational position of the shaft into a fluid level, and transitioning a stop-fill assembly between an open configuration and a closed configuration based on the rotational position of the shaft.

According to another aspect of the present disclosure, a gauge assembly is provided that comprises a shaft that rotates according to a change in fluid level and a stop-fill assembly having a valve shuttle that rotates in conjunction with the rotation of the shaft and moves between an open position and a closed position. The valve shuttle can include a flow surface that is at an angle to the direction of fluid flow such that the pressure of fluid flowing across the flow surface assists in rotating the valve shuttle from the open position to the closed position.

According to another aspect of the present disclosure, a combination overfill protection device, fluid level gauge, and service valve for use on a tank operable to contain fluids and gases is provided. The service valve has a body defining a set of wrench flats, an input port, and a tank port, at least one of the wrench flats defining a recess thereinto. The overfill protection device has a float that rotates a shaft in response to a change in fluid level, the shaft transitioning the overfill protection device between opened and closed configurations and rotating a magnet within the service valve body proximate the recess in the wrench flat. A removable gauge dial has a dial magnet housing sized to provide a friction fit into the recess in the wrench flat such that rotation of the magnet within the service valve actuates a dial magnet housed substantially in the dial magnet housing.

According to another aspect of the present disclosure, a system for determining a fluid level in a pressurizable container is provided that comprises a service valve having a set of wrench flats, with one of the wrench flats having a recess of therein. A stop-fill device is interconnected with the service valve and operable to rotate a first magnet inside the service valve in proximity to the recess in proportion to the amount of fluid in the pressurizable container. A gauge having a dial face and a dial is attached to a second dial magnet, the second dial magnet housed in a magnet protrusion on a side of the dial face opposite the dial and operable to fit into the recess in the service valve such that the dial moves on the dial face proportionately to the degree of rotation of the first magnet inside the service valve.

In yet another embodiment, an overfill protection system for use with removable magnetic dial gauge is provided. The system comprises a service valve defining a recess, the recess operable to receive the magnetic gauge dial in a friction fit. A shaft providing a magnet extends into the service valve and in proximity to the recess, the shaft operable to rotate the magnet in proportion to a level of fluid in contact with a float geared to the shaft. The system also comprises an overfill protection mechanism operating in response to the rotation of the shaft and moving from an open state to a closed state as the level of fluid in contact with the float increases.

In another embodiment, a system for determining a fluid level in a pressurizable container is provided. The system includes a service valve having a set of wrench flats, one of the wrench flats having a first concave feature defined therein. A stop-fill device interconnected with the service valve and operable to rotate a first magnet inside the service valve in proximity to the first concave feature in proportion to the amount of fluid in the pressurizable container is provided. A gauge is also provided having a dial face and a dial attached to a second dial magnet, the second dial magnet housed in a magnet protrusion on a side of the dial face opposite the dial, the magnet protrusion defining a second convex feature that is operable to friction fit into first concave feature on the service valve such that the dial moves on the dial face proportionately to the degree of rotation of the first magnet inside the service valve.

In another embodiment a system for determining a fluid level in a pressurizable container comprising is provided. The system includes a service valve having a set of wrench flats, one of the wrench flats having a first concave feature defined therein, a stop-fill device interconnected with the service valve and operable to rotate a first magnet inside the service valve in proximity to the first concave feature in proportion to the amount of fluid in the pressurizable container, and a magnetic field sensor in a sensor housing interfitting with the first concave feature. At least one signal wire is connected to the magnetic field sensor, and a fluid level display connected to the at least one signal wire to receive electrical signals corresponding to a magnetic field sensed by the magnetic field sensor and provide a fluid level display corresponding to the sensed magnetic field.

A method of filling a tank using the apparatus and system described herein includes positioning a tank having cylindrical sidewall defining a central axis extending longitudinally therethrough, a generally semi-hemispherical bottom wall, a generally semi-hemispherical top wall and a service valve located on the top wall with the cylindrical in a generally vertical orientation. The service valve is connected to a source of pressurized fluid and opened to admit the fluid into the tank. The fluid is directed through a stop-fill assembly including a valve body, and a float operatively connected to a shuttle body operable to engage the valve body and block the flow of fluid into the tank. To enter the tank, fluid flows betweens the shuttle body and the valve body.

Fluid flowing through the stop-fill assembly is directed radially away from the central axis of the cylinder at a location above the float. The float is lifted by filling the tank with the pressurized fluid. Fluid flow into the tank is cut off by operating the shuttle body with the float to engage the shuttle body with the valve body and block fluid flow into the tank when the fluid level in the tank reaches a predetermined level. In one aspect, the float is connected to a counterbalance with a float arm having a rotating connection with a shaft connected to the shuttle body such that the step of operating the shuttle body with the float comprises rotating the shuttle body with the float arm to move the shuttle body into engagement with the valve body. In one variation, the step of directing the fluid radially away from the central axis of the cylinder is accomplished by directing the fluid through a least one port in the valve body that extends radially away from a longitudinal axis of the shaft.

In another aspect, the method also includes the step of displaying the fluid level in the tank with a level indicator operatively coupled to the float. The indicator may be a dial indicator mounted on the service valve or a remotely located indicator electrically coupled to a sensor mounted on the service valve.

In yet another aspect, a gauging device for providing an indication of a fluid level in a pressurizable container includes a shaft rotating about a first axis in response to an amount of fluid in the presssurizable container, a shaft magnet attached to a first end of the shaft and a dial attached to dial magnet. The dial magnet is magnetically coupled to the shaft magnet and rotates about a second axis that is orthogonal to the first axis. In this regard, the shaft magnet rotates within a throat cavity of a gas service valve and the dial magnet rotates in proximity to the shaft magnet and exterior to the service valve. In one variation, a plane defined by the rotation of the shaft magnet is offset by a predetermined distance from the second axis of rotation.

BRIEF DESCRIPTION OF THE DRAWINGS

For a more complete understanding, reference is made to the drawings, wherein like reference numbers are used herein to designate like elements throughout, and wherein:

FIG. 10 is a cross-sectional view of the stop-fill assembly taken along section X-X in FIG. 9;

FIG. 10A is a partial cross-sectional view of the stop-fill assembly taken along section X-X in FIG. 9;

FIG. 29 is a partial sectional view of the stop-fill assembly of FIG. 27 taken along line 29-29 of FIG. 27;

FIG. 30 is a partial sectional view of the stop-fill assembly of FIG. 27 taken along line 30-30 of FIG. 27;

DETAILED DESCRIPTION

Figures 1, 2:
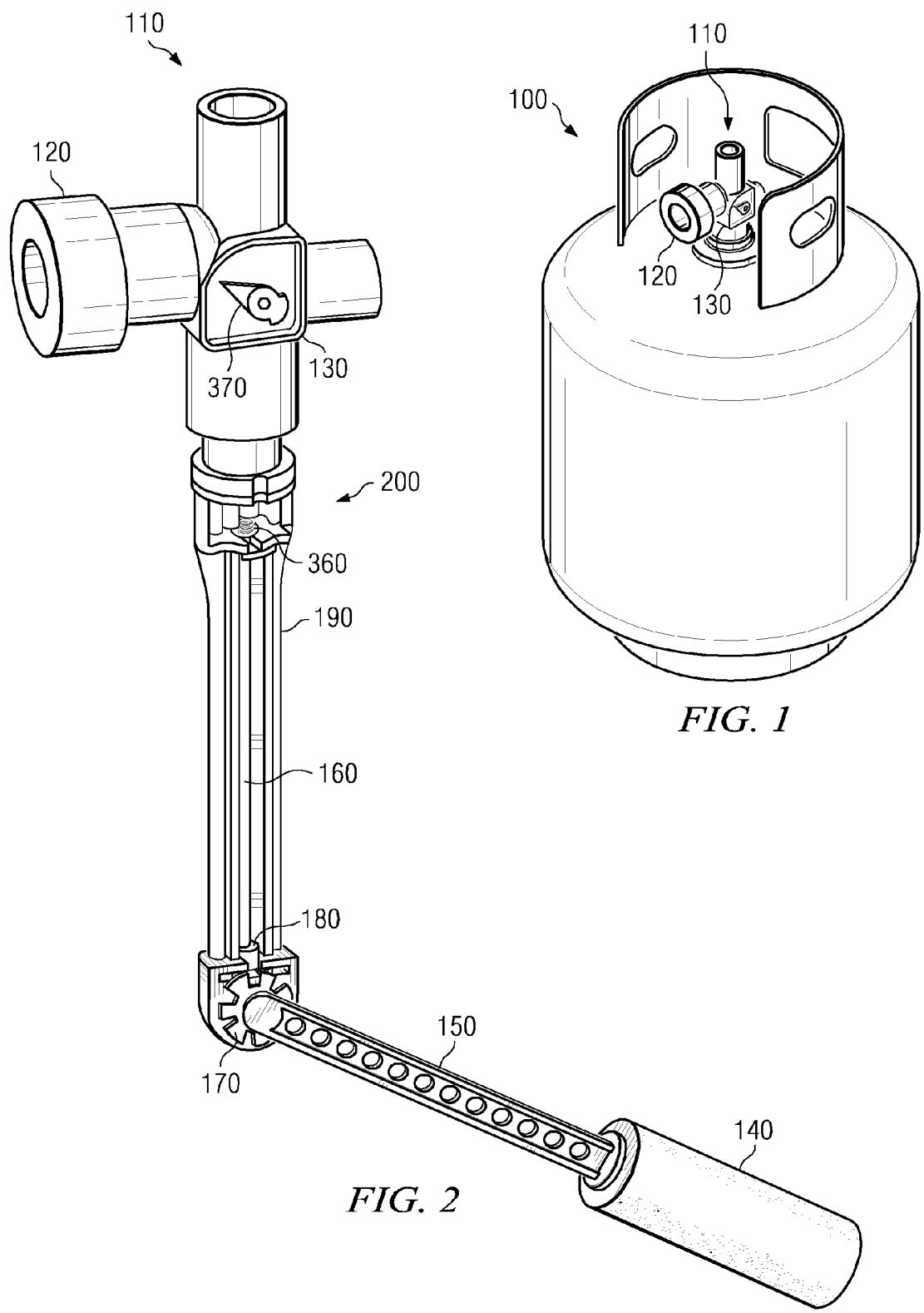
FIG. 1 shows a perspective view of a tank suitable for use with the present stop-fill device.
FIG. 2 shows a perspective view of a gauge assembly incorporating the present stop-fill device.

FIG. 1 shows a perspective view of a tank 100 having a gauge assembly 110 according to the present disclosure. FIG. 2 shows a perspective view of the gauge assembly 110. It will be appreciated that the tank 100 is shown for exemplary purposes only and is in no way intended to limit the scope of the present disclosure.

The gauge assembly 110 includes a port 120 that is accessible from outside the tank 100. The port 120 allows fluid to be moved in and out of the tank 100. The gauge assembly 110 also includes an indicator 130 for providing an indication of the fluid level in the tank 100. In the present embodiment, the indicator 130 is a dial-type indicator, but any type of indicator could be used.

Figure 7:
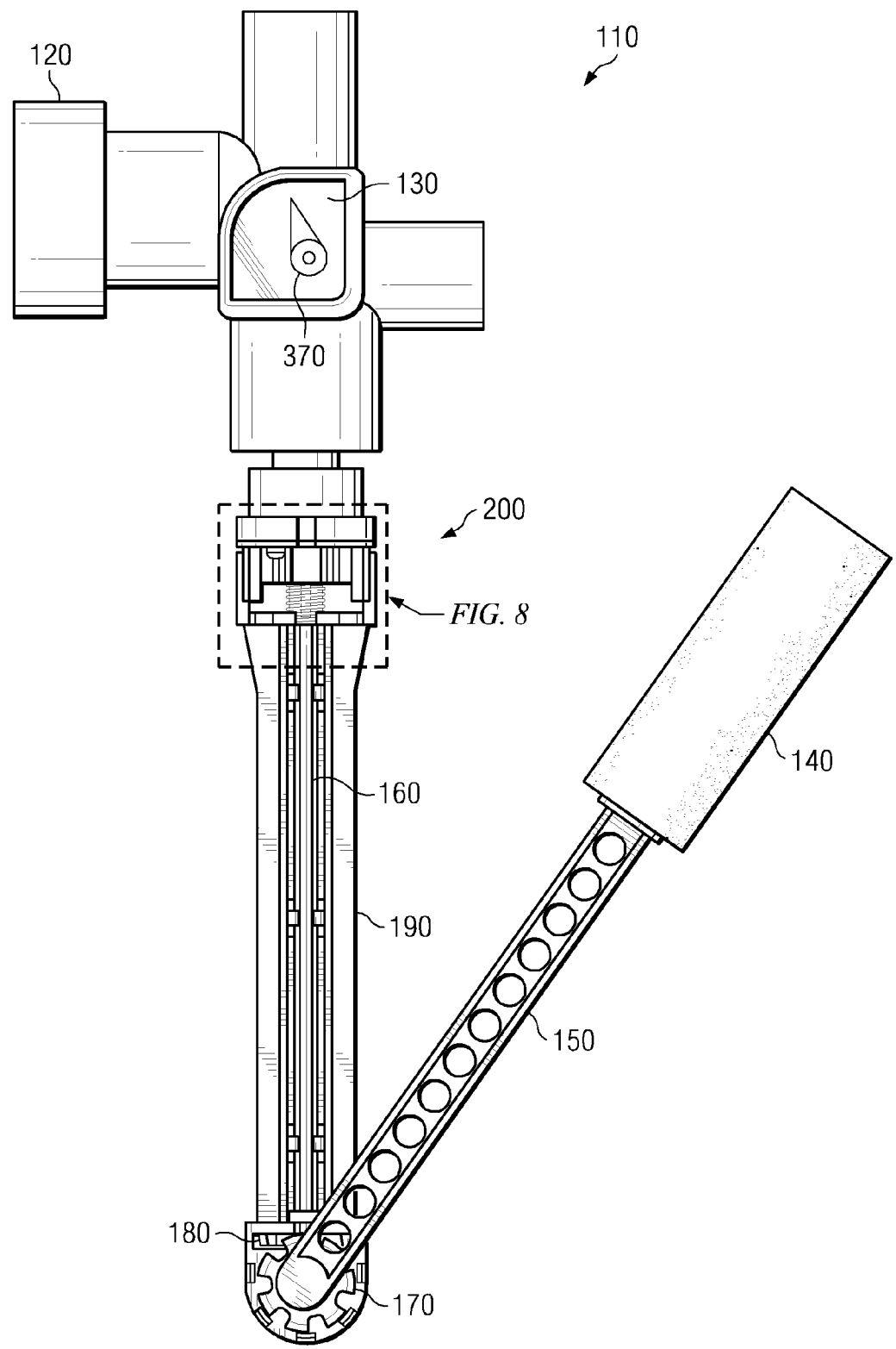
FIG. 7 is an orthogonal view of the gauge assembly shown in FIG. 2 in an alternate position.

As shown in FIG. 2, the gauge assembly 110 includes a stop-fill assembly 200, a support member 190, a vertical shaft 160 disposed within the support member 190, a float 140 and a float arm 150. The float 140 can be made of close foam material, and the vertical shaft 160, the support member 190, and the float arm 150 can be made of any rigid material, including an acetal such as Delrin®. A distal end of the float arm 150 is fixed to the float 140, and a proximal end of the float arm 150 is connected to the vertical shaft 160 such that the float arm 150 is rotatable about the base of the vertical shaft 160. As the fluid level in the tank 100 changes, the float 140 moves up or down with the fluid level causing the float arm 150 to rotate about the base of the support member 190. The float arm 150 is shown in an alternate position in FIG. 7. Rotation of the float arm 150 about the base of the support member 190 causes the vertical shaft 160 to rotate about the longitudinal axis of the vertical shaft 160. In the present embodiment, the rotation of the float arm 150 is translated to the rotation of the vertical shaft 160 by a sector gear 170, fixed to the proximal end of the float arm 150, that engages a pinion gear 180, fixed to the lower end of the vertical shaft 160.

Figure 3:
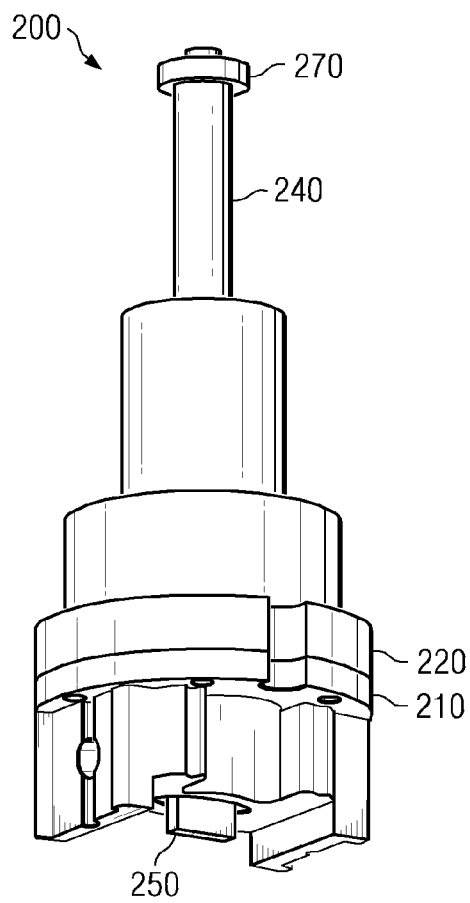
FIG. 3 is a perspective view of the stop-fill assembly included in the gauge assembly shown in FIG. 2.
Figure 5:
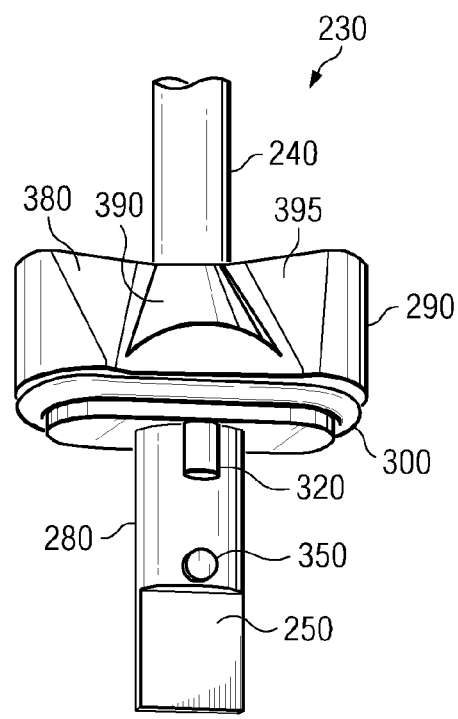
FIG. 5 is a perspective view of a valve shuttle included in the stop-fill assembly shown in FIGS. 3 and 4.
Figure 4:
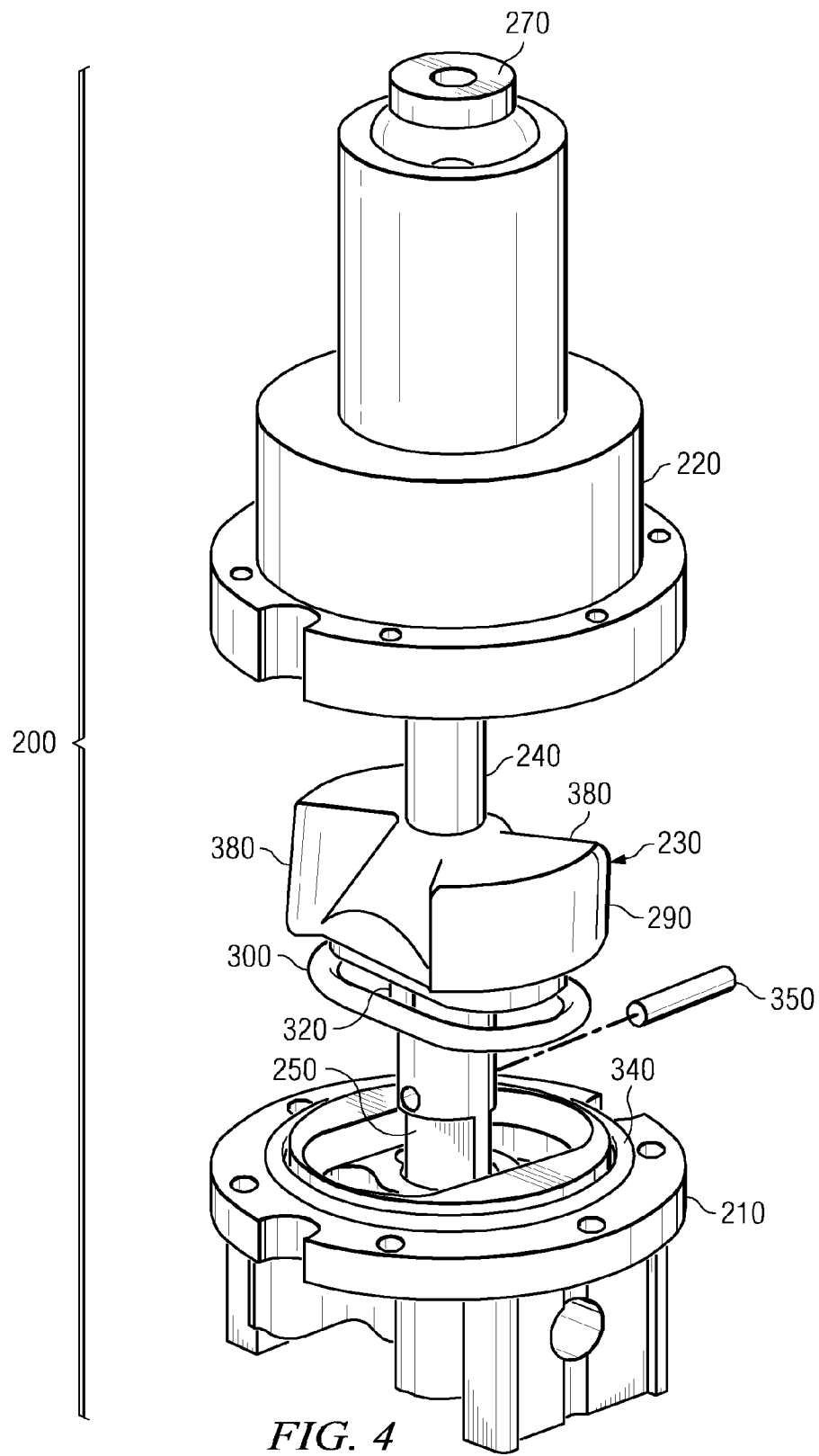
FIG. 4 is an exploded view of the stop-fill assembly shown assembled in FIG. 3.
Figure 6:
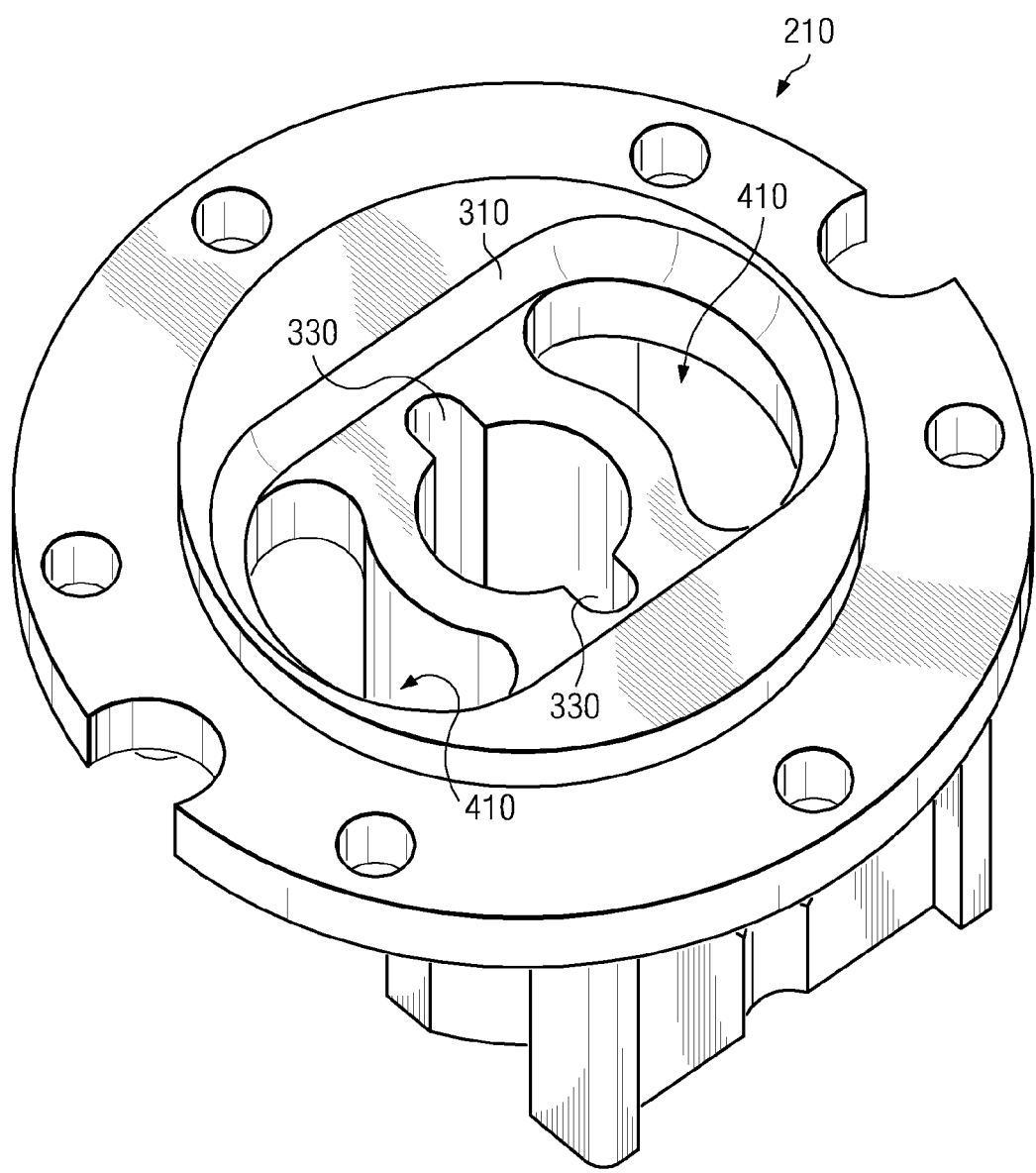
FIG. 6 is a perspective view of a valve body included in the stop-fill assembly shown in FIGS. 3 and 4.

The stop-fill assembly 200 is fixed to an upper end of the support member 190. FIG. 3 shows a perspective view of the stop-fill assembly 200, and FIG. 4 shows an exploded view of the stop-fill assembly 200. The stop-fill assembly 200 includes a valve body 210 (also shown in FIG. 6), a valve head 220, and a valve shuttle 230 (also shown in FIG. 5), all of which can be made of any rigid material, including an acetal such as Delrin® or nylon or ultem.

Figure 8:
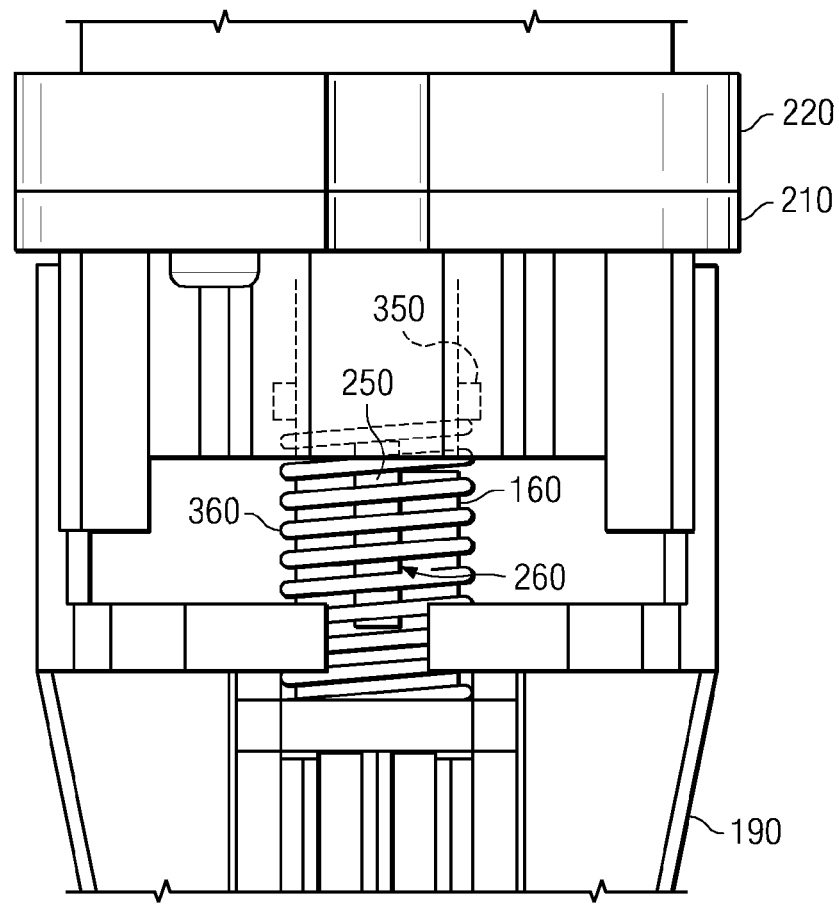
FIG. 8 is an enlarged view of the area in FIG. 7 designated as 8.

The valve shuttle 230 has a shuttle body 290 that serves as a blocking member for blocking fluid flow, an upper shaft 240 that extends upwardly from the shuttle body 290 through the valve head 220, and a lower shaft 280 that extends downwardly from the shuttle body 290. A magnet 270 that serves as an indicator driving member is fixed to an upper end of the upper shaft 240 for driving the indicator 130. A tab 250 is formed in the lower end of the lower shaft 280 for engaging with a slot 260 (see FIG. 8) formed in an upper end of the vertical shaft 160 in order to transmit rotary motion of the vertical shaft 160 to the valve shuttle 230. As the vertical shaft 160 rotates, the magnet 270 also rotates. The magnet 160 is coupled with a dial 370 of the indicator 130 such that the rotation of the magnet 270 causes rotation of the dial 370 according to known methods. The lower shaft 280 also includes an opposing pair of release ribs 320 for engaging with an opposing pair of release slots 330 formed in the valve body 210 when the stop-fill assembly 200 is in a closed position.

It is contemplated that an indicator other than the one used in the present embodiment can be used that does not require the presence of the magnet 270. For example, an indicator driving member such as an encoded disk could be used in place of the magnet 270 and an indicator could be used that optically couples with the encoded disk to translate the rotational position of the encoded disk into a fluid level. In fact, it is contemplated that any kind of indicator and/or indicator driving member can be used that translates the rotation of the upper shaft 240 into a fluid level.

The stop-fill assembly 200 includes an optional valve o-ring 300 for assisting in sealing the shuttle body 290 to a seal surface 310 of the valve body 210 when the stop-fill assembly is in the closed position. A seal 340 can optionally be provided for assisting in sealing the juncture between the valve head 220 and the valve body 210. Depending on how the valve body 210 is attached to the valve head 220, the seal 340 can be unnecessary, for example if the valve body 210 and valve head 220 are welded together, for example by ultrasonic welding. A spring retainer 350 is provided in a through-hole in the lower shaft 280 and extends from both sides of the lower shaft 280 in order to retain an upper end of a spring 360 (see FIG. 8). It will be appreciated that, instead of using a separate item as the spring retainer 350, the spring retainer 350 can instead be integrally formed in the valve shuttle 230.

Figure 9:
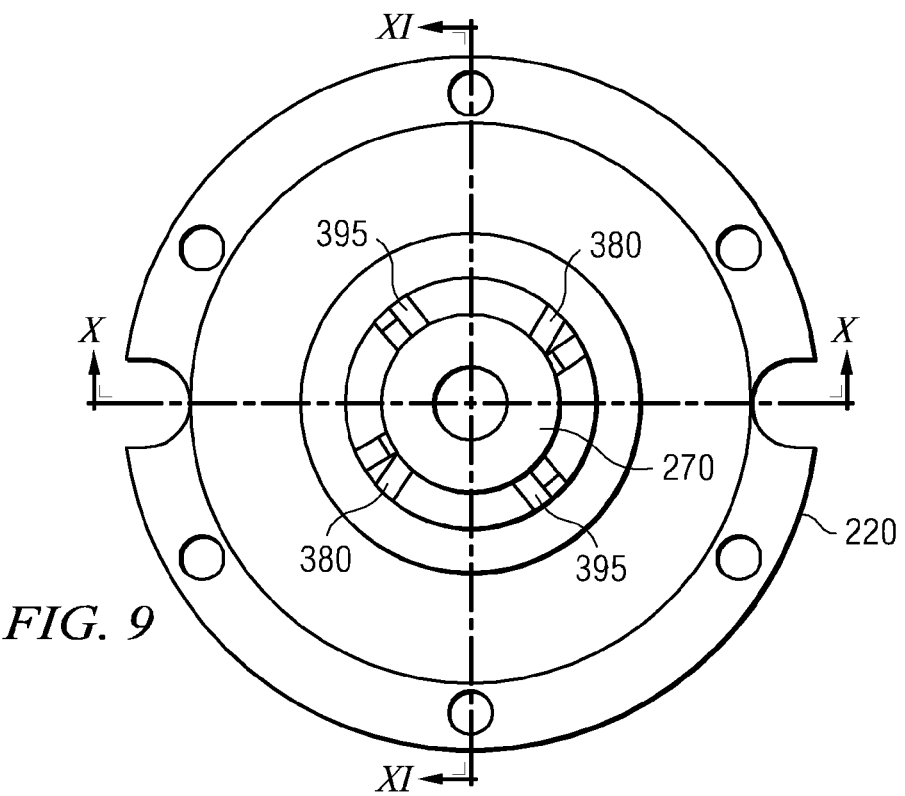
FIG. 9 is a top view of the stop-fill assembly in a closed position.
Figure 11:
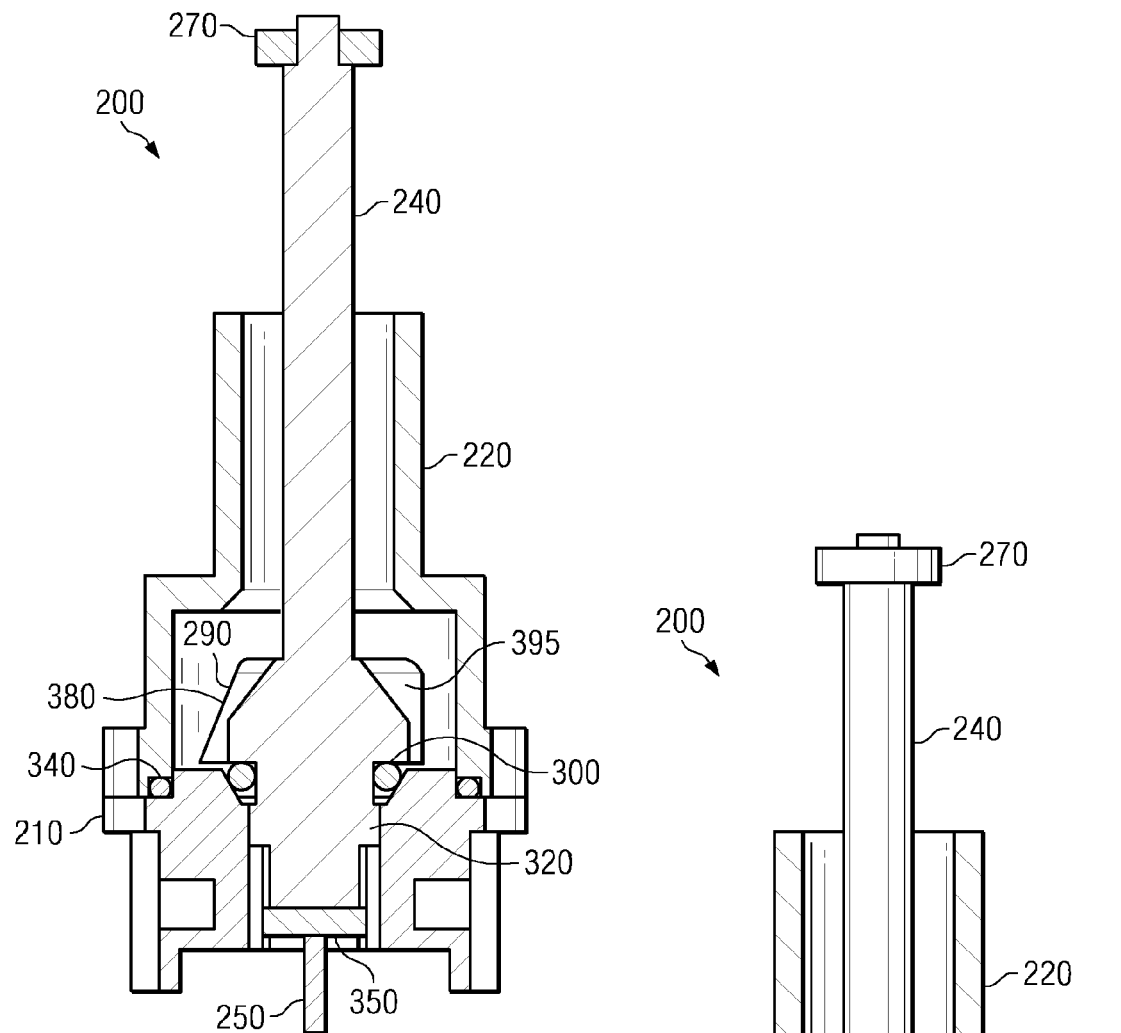
FIG. 11 is a cross-sectional view of the stop-fill assembly taken along section XI-XI in FIG. 9.
Figure 11A:
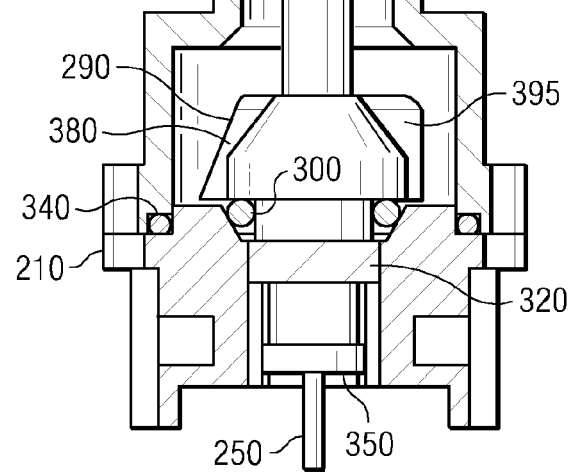
FIG. 11A is a partial cross-sectional view of the stop-fill assembly taken along section XI-XI in FIG. 9.
Figure 13:
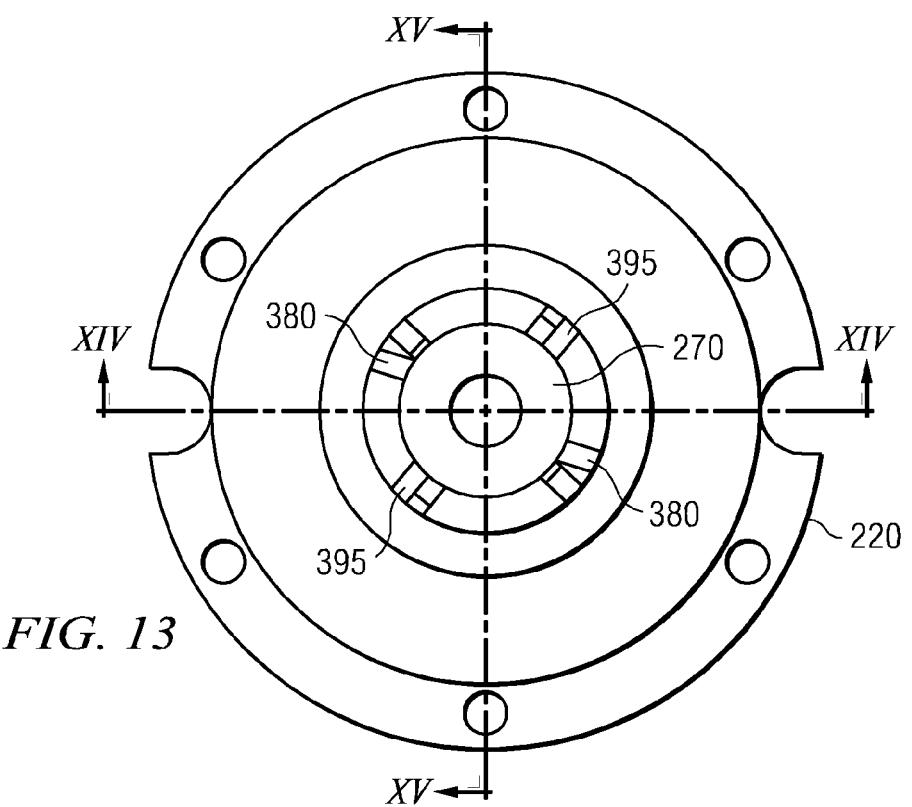
FIG. 13 is a top view of the stop-fill assembly in an open position.

The stop-fill assembly 200 can transition between an open position and a closed position. In the open position, fluid from the port 120 can flow through the stop-fill assembly 200, while in the closed position fluid from the port 120 is prevented from flowing through the stop-fill assembly 200. A top view of the stop-fill assembly 200 is provided in FIGS. 9 and 13, where FIG. 9 shows a top view of the stop-fill assembly 200 when in the closed position, and FIG. 13 shows a top view of the stop-fill assembly 200 when in the open position. FIGS. 10 and 11 show cross-sectional views and FIGS. 10A and 11A show partial cross-sectional views of the closed position along section lines X-X and XI-XI, respectively, of FIG. 9, while FIGS. 14 and 15 provide cross-sectional views of the open position along section lines XIV-XIV and XV-XV, respectively, of FIG. 13.

Figure 14:
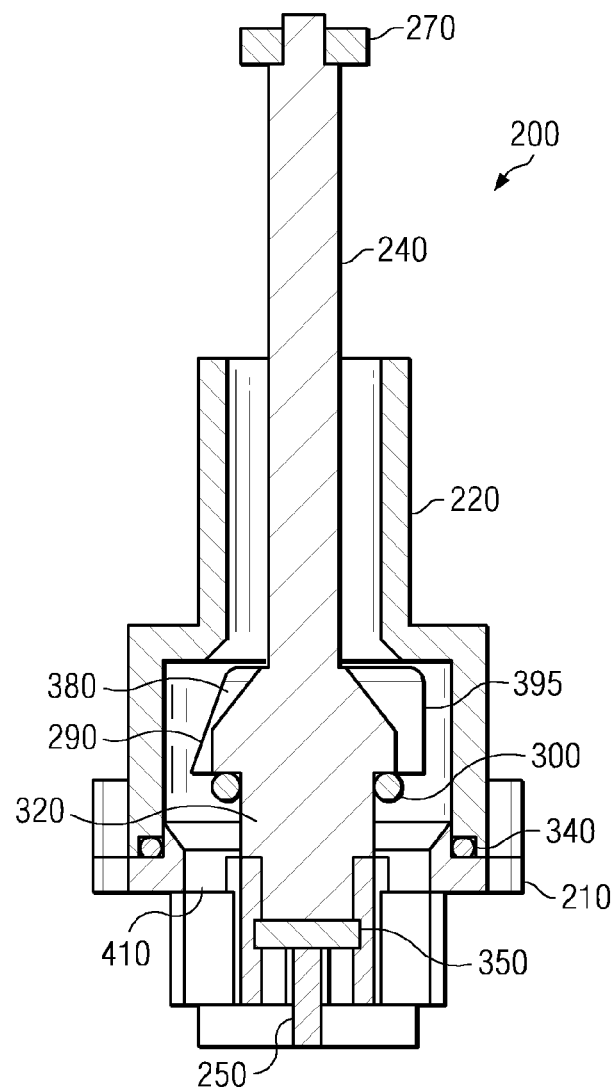
FIG. 14 is a cross-sectional view of the stop-fill assembly taken along section XIV-XIV in FIG. 13.
Figure 14A:
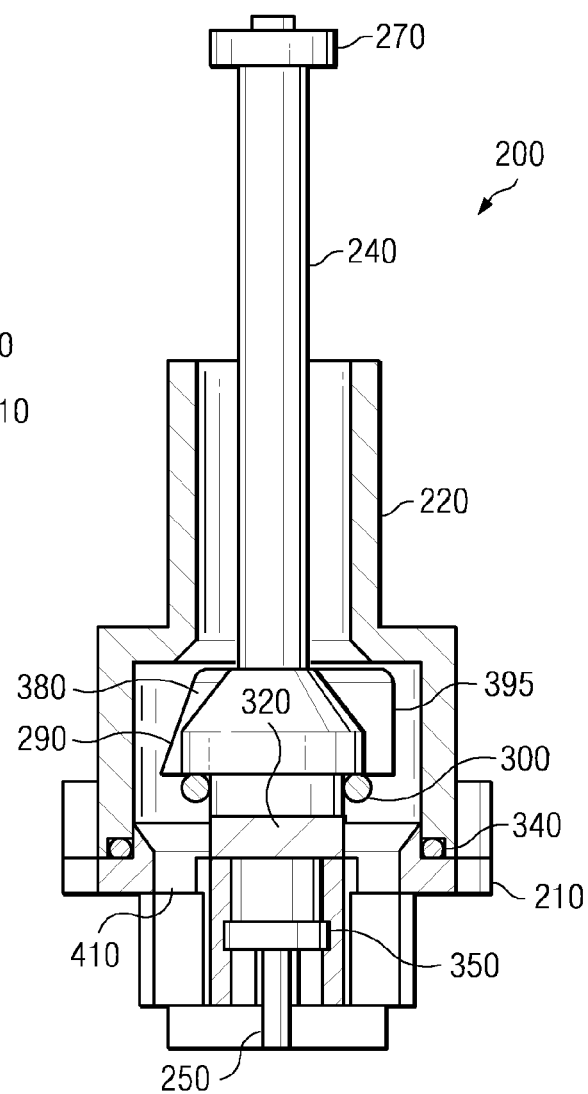
FIG. 14A is a partial cross-sectional view of the stop-fill assembly taken along section XIV-XIV in FIG. 13.
Figure 15:
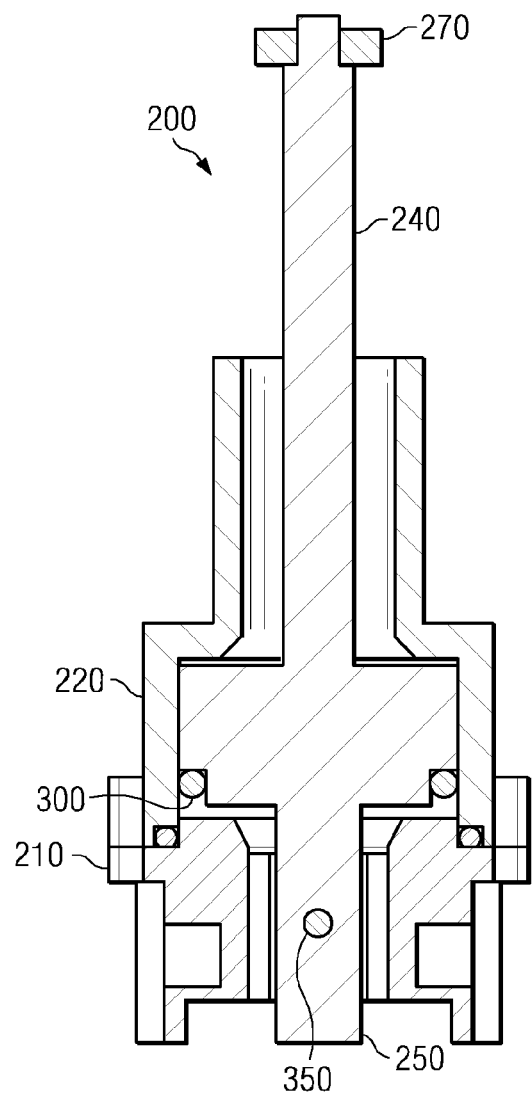
FIG. 15 is a cross-sectional view of the stop-fill assembly taken along section XV-XV in FIG. 13.
Figure 15A:
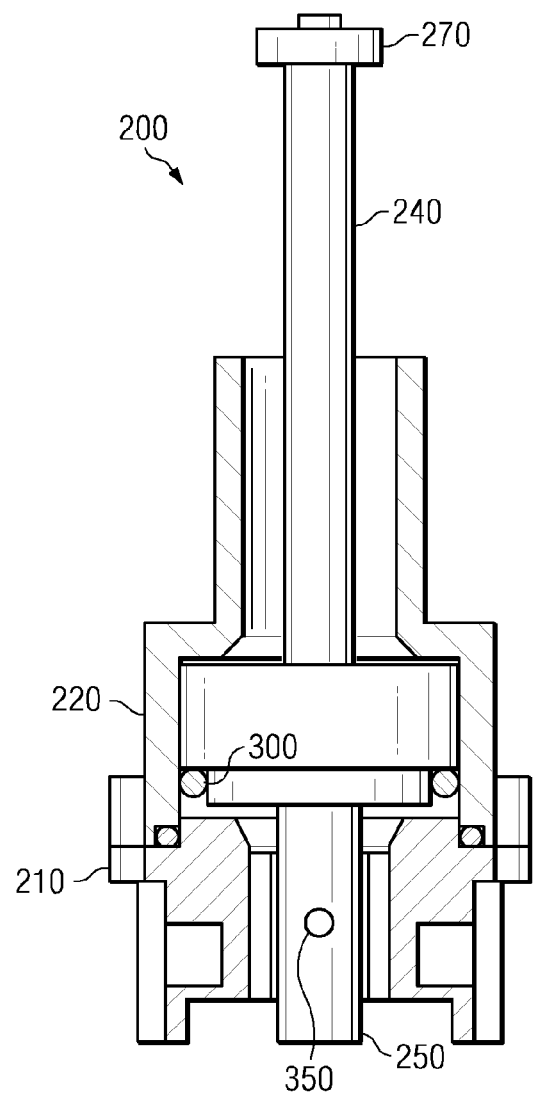
FIG. 15A is a partial cross-sectional view of the stop-fill assembly taken along section XV-XV in FIG. 13.

In the open position, as shown in FIGS. 14 and 15 and in FIGS. 14A and 15A, and under the pressure of incoming fluid from the port 120 pressing downward on the shuttle body 290, the release ribs 320 of the valve shuttle 230 ride against the upper surface of the valve body 210. Thus, as best shown in FIG. 14, the release ribs 320 are what keep the stop-fill assembly 200 open against the force of a fluid flow from the port 120. When the gauge assembly 110 is in the empty position (i.e., having the float arm 150 rotated to the position corresponding with an empty condition of the tank) the release ribs 320 are at 90 degree angles to the slots, sitting on the upper surface of the valve body 210 so that the valve shuttle 230 cannot go down. In this configuration, fluid from the port 120 travels downward through the space between the upper shaft 240 and the valve head 220, around the shuttle body 290 across flow surfaces 380, 390, 395, then through fill ports 410 en route to the inside of the tank 100.

Figure 12:
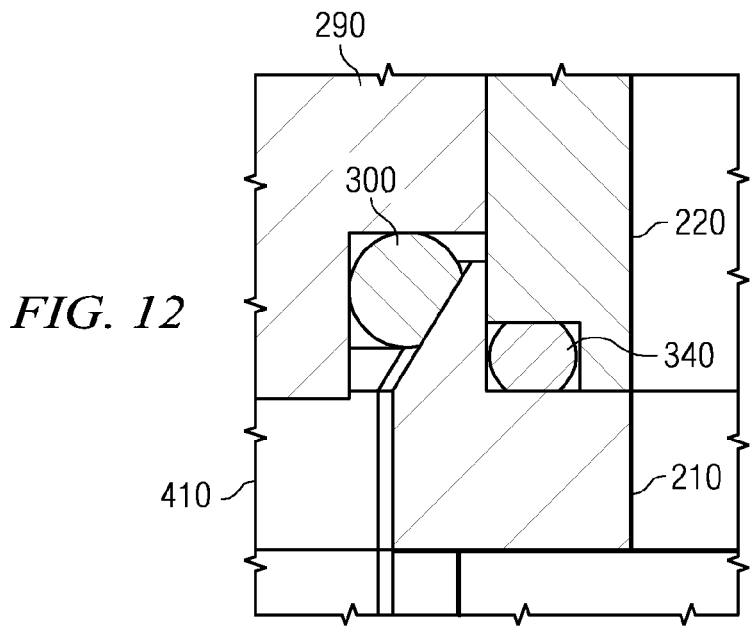
FIG. 12 is an enlarged view of the area in FIG. 10 designated as 12.

As the vertical shaft 160 rotates due to the motion of the float arm 150, the valve shuttle 230 rotates and eventually rotates to the position shown in FIGS. 10 and 10A and FIGS. 11 and 11A where the release ribs 320 line up with the release slots 330, which is best shown in FIG. 11. When this happens, the downward pressure of the fluid flow, which is sufficient to overcome the opposing pressure of the spring 360, causes the release ribs 320 to drop into the release slots 330 due to the force from the fluid flow. As shown in FIGS. 10 and 12, the shuttle body 290 acts as a blocking member since the contacting surfaces of the shuttle body 290 and the valve body 210 prevent fluid from traveling from the space above the shuttle body 290 to the fill ports 410 or into the tank 100. The optional valve o-ring 300 assists in sealing the junction between the shuttle body 290 to the valve body 210.

Once the stop-fill assembly 200 is in the closed position, filling of the tank 100 is halted and at some point the source of the incoming fluid is disconnected from the port 120 or the port 120 is closed. At this point, since there is no longer any pressure against the upper side of the valve shuttle 230, the valve shuttle 230 is moved upward under the force of the spring 360 so that the stop-fill assembly 200 transitions to the open position. This allows for fluid to exit the tank 100 by traveling back up through the stop-fill assembly 200 to the port 120.

In the present embodiment, the total rotation of the float arm 150 between full and empty fluid levels is approximately 100 degrees, while the total rotation necessary for moving the valve shuttle 230 between the open position and the closed position is pinion gear 180 is close to a one to one relationship. However, it will be appreciated that the angle of the range of motion of the float arm 150 can vary, for example based on the size and shape of the tank 100, and the angle of the range of motion of the valve shuttle 230 can vary, for example based on the requirements of the indicator 130. Thus the relationship between the sector gear 170 and the pinion gear 180 can vary so long as the relationship is such that it allows the angle of the range of motion of the float arm 150 and the angle of the range of motion of the valve shuttle 230 needed at the dial 370 of the indicator 130 to coincide.

In some cases there may be relatively high pressures against the shuttle body 290 due to the filling pressure and the fluid flow. The actual flotation or the buoyancy of the float 140 produces a relatively small torque, so friction between the release ribs 320 and the upper surface of the valve body 210 might be high and resist rotation of the valve shuttle 230. For this reason, it is desirable to keep the diameter of rotation of the release ribs 320 as small as practical to reduce the resisting torque. Since the torque felt by the valve shuttle 230 is tangential force times moment arm, reducing the moment arm (i.e., diameter of rotation of the release ribs 320) reduces the resisting friction torque. It is also desirable to form the valve shuttle 230, particularly the release ribs 320, and the valve body 210, particularly the upper surface thereof, from a material having a low coefficient of friction against itself, for example an acetal such as Delrin® or nylon or ultem. Another option is to provide a friction-reducing material (not shown), for example a Teflon® fill material, between the release ribs 320 and the upper surface of the valve body 210, that is made of a material having a low coefficient of friction.

In addition, the flow surfaces 380 of the shuttle body 290 are slanted such that when fluid flows across the flow surface 380 the pressure of the fluid against the slanted surface will tend to rotate the valve shuttle 230 in a predetermined direction (clockwise in the present embodiment) to help overcome the friction between the release ribs 320 and the upper surface of the valve body 210. Also, since fluid flow into the tank 100 across the slanted flow surfaces 380 will tend to rotate the valve shuttle 230 in a predetermined direction as the tank 100 is being filled, clearances are reduced or removed between portions of various parts, such as between portions of the tab 250 and the slot 260 and between portions of engaged teeth of the sector gear 170 and the pinion gear 180, while the tank 100 is being filled. For example, the slot 260 can be slightly wider than the thickness of the tab 250 to allow for the tab 250 to be longitudinally inserted and removed from the slot 260. As a consequence, the tab 250 would be free to rotate to some degree while inserted in the slot 260. Therefore, if the valve shuttle 230 is not provided with a slanted surface such as flow surface 380, turbulence from incoming fluid flowing across the valve shuttle 230 could cause unpredictable rotational motion of the valve shuttle 230. However, since the fluid flow across flow surfaces 380 tends to rotate the valve shuttle 230 in a predetermined direction, the tab 250 will be rotated, in the predetermined direction, relative to the slot 260 at or near a maximum degree allowed by the total clearance between the tab 250 and the slot 260 such that portions of the tab 250 contact portions of the slot 260. That is, a clearance is reduced or eliminated between portions of the tab 250 and the slot 260 as fluid is flowing into the tank 100. It will be appreciated that a clearance between portions of teeth of the sector gear 170 and the pinion gear 180 is also reduced or eliminated since the rotation of the valve shuttle 130 is transferred to push together engaging teeth of the pinion gear 180 and the sector gear 170 as fluid is flowing into the tank 100. Thus, with the slanted flow surface 380, clearances between portions of various parts are reduced or eliminated allowing a greater degree of accuracy to be achieved in predicting the location of the release ribs 320 relative to the release slots 330 while the tank 100 is being filled.

The shuttle and valve can be designed by considering control of the pressure zones through the flow path of the valve. The valve is preferably designed to create low pressure zones above the shuttle and high pressure zones below the shuttle. Such a design will tend to lessen the total downward force on the shuttle thus reducing the friction working against the desired rotation of the shuttle. The area of flow at various points along the flow path can be plotted and the pressure profile determined. Thus, the specific design of the chamber and the shuttle can be modified to change the pressure profile as desired.

Figure 16A:
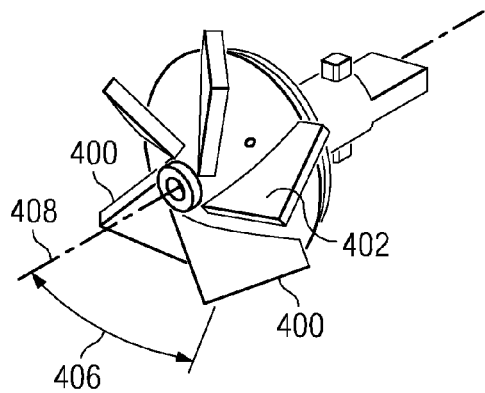
FIGS. 16A-D are perspective views of various valve shuttles having vanes.
Figure 16B:
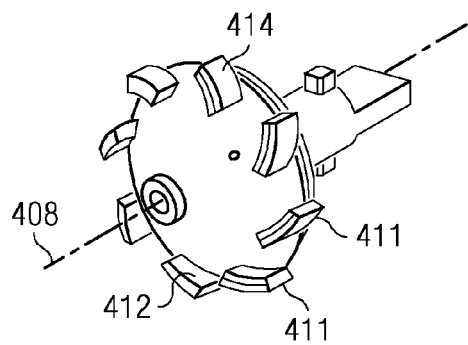
Figure 16C:
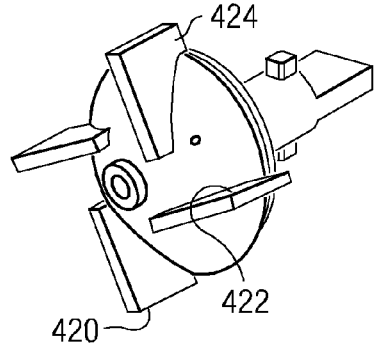
Figure 16D:
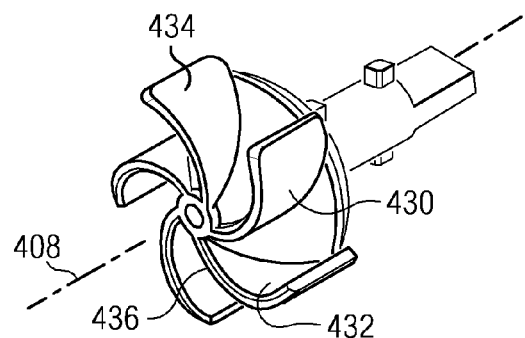
Figure 17A:
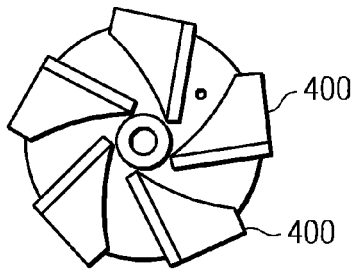
FIGS. 17A-D are perspective end views of the valve shuttles shown in FIGS. 16A-D.
Figure 17B:
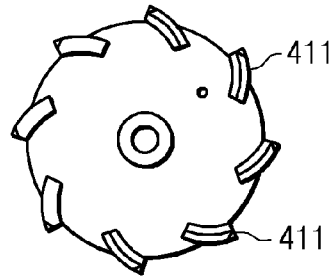
Figure 17C:
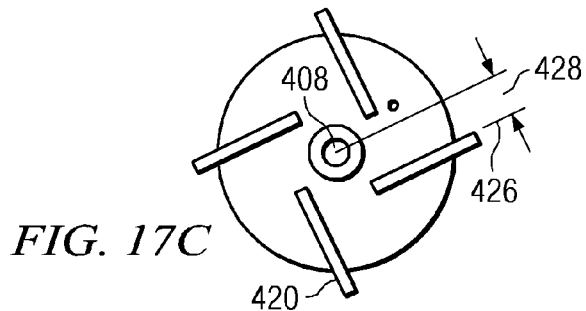
Figure 17D:
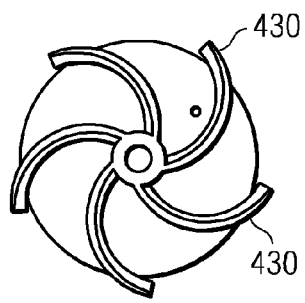

In the event that smooth slanted flow surfaces 380 are insufficient to provide the desired rotation force to valve shuttle 230 in a predetermined direction to help overcome the friction between the various portions of the valve shuttle which are in contact with the valve body, vanes can be provided on the valve shuttle of a predetermined shape and size to impart the desired rotational force to the valve shuttle in a predetermined direction. FIGS. 16A-D illustrated various configuration of vanes, and FIGS. 17A-D are end views of the respective figures in FIGS. 16A-D. Any desired shape of the vanes can be utilized, and while all of the illustrated vanes extend from the surface of the shuttle, it will be appreciated that vanes could be supplied in the form of grooves in the shuttle. FIGS. 16A and 17A show vanes 400 having a uniform thickness and having a substantially flat front side surface 402 and a substantially flat rear side (not shown). Vanes 400 are set at a predetermined angle 406 to shuttle axis 408. FIGS. 16B and 17B show vanes 411 in the shape of a curved plate of substantially uniform thickness and having a curved front side 412 and a curved rear side 414. The front and rear sides can be oriented such that they are substantially parallel to the shuttle axis 408. FIGS. 16C and 17D illustrate vanes 420 having a substantially uniform thickness and having a flat front side 422 and a flat rear side 424. The vanes have a longitudinal axis 426 which is perpendicular to the shuttle axis 408 and set off the shuttle axis a predetermined distance 428. FIGS. 16D and 17D illustrate vanes 430 having a substantially uniform cross-section and a curved front side 432 and a curved rear side 434. The inner end 436 of vanes 432 is adjacent to the shuttle axis 408 and surfaces of the front and rear side 432 and 434 are parallel to axis 408. While the vanes have been illustrated having substantially uniform thickness, it will be appreciated by those skilled in the art that they may have non-uniform thickness. The base where the vanes attach to the shuttle can be thicker than the other end. The flow of fluid across the vanes may assist in rotating the valve shuttle from the open position to the closed position. The vanes can be shaped such that the thickness of the vanes varies in the shape of an airfoil.

The spring 360 allows for the stop-fill assembly 200 to remain in the open position when not under the pressure of incoming fluid. However, in some cases the pressure of fluid in the tank 100 is sufficient to cause the valve shuttle 230 to move to the open position when the port 120 is open so that even without the spring 360 fluid can be removed from the tank 100.

It is contemplated that an arrangement other than the above embodiment having the float arm 150 can be used in conjunction with other features disclosed herein. One option is to use a spiral gauge having a float on the vertical shaft 160 where the vertical shaft 160 has a ramp going up such that, as the float moves up and down the vertical shaft 160, the shaft 160 rotates.

It is also contemplated that the device could be modified to eliminate the indicator or the stop-fill function. For example, the valve shuttle 230 could be replaced with a shaft so that the gauge assembly drives the indicator 130 but does provide stop-fill functionality. As another example, the indicator 130 and magnet 270 could be eliminated so that the gauge assembly has stop-fill functionality but not an indicator.

Figure 18:
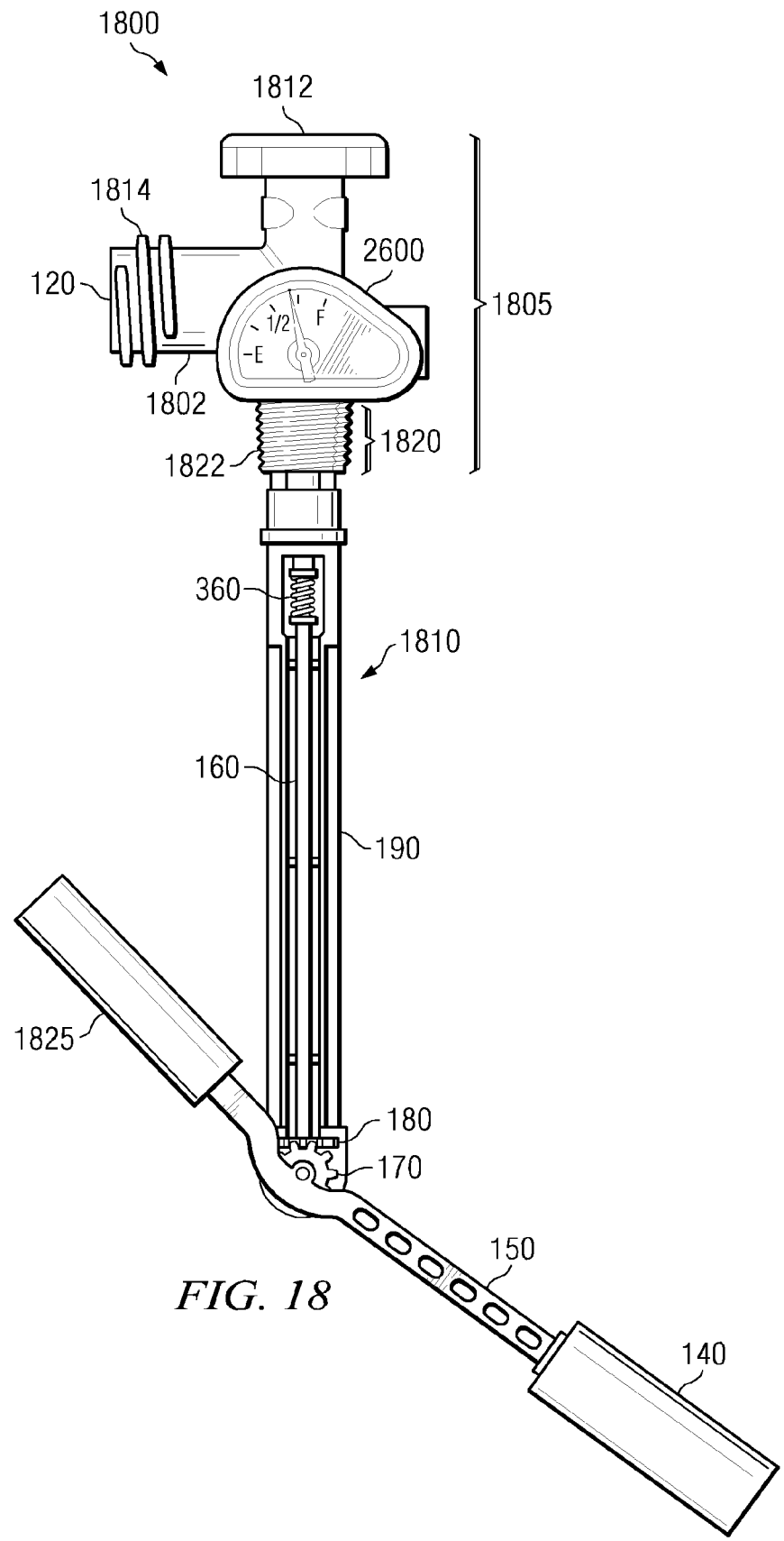
FIG. 18 is a side view of a combination service valve, stop-fill assembly, and liquid level indicator in accordance with aspects of the present disclosure.

Referring now to FIG. 18, a side view of a combination service valve stop-fill assembly and liquid level indicator in accordance with additional aspects of the present disclosure is shown. As will be described, and as can be seen from FIG. 18, the combination 1800 shares many parts and features that have been previously described herein. A service valve assembly 1805 connects to a stop-fill assembly 1810. A dial 1815 is also provided and interconnects with the service valve assembly 1805. In some embodiments the dial may be removable and reattachable by the user, while in other embodiments the dial may be permanently or semi-permanently affixed to the service valve. The service valve assembly 1805 provides a port 120 in a valve outlet 1802. The service valve assembly 1805 also provides port threads 1814. The port threads 1814 may be used to interconnect the service valve assembly 1805 with an external device such as a filling device or appliance. A tank connection 1820 (FIG. 20) is also provided for connecting with a tank such as the tank 100 shown in FIG. 1. To aid in connection to the tank, the tank connection 1820 may provide tank connection threads 1822. In some embodiments, the threads 1822 will mate with threads provided on the tank 100. Also shown in the embodiment of FIG. 18 is a service valve knob 1812. In some embodiments, the service valve knob 1812 may be used to allow or restrict the flow of gas through the service valve assembly 1805.

The stop-fill assembly 1810 is similar in many respects to the stop-fill devices that have been previously described herein. A support member 190 secures a rotatable vertical shaft 160 that attaches to a pinion gear 180. The pinion gear 180 engages a sector gear 170 which attaches to a float arm 150. As before, a float 140 is provided at one end of the float arm 150. In the embodiment shown in FIG. 18 a counter balance 1825 is provided at the end of the float arm 150 opposite the float 140. The counter balance 1825 may serve to decrease the resistance to movement that may be encountered internally in the stop-fill assembly 1810. Additionally, as can be seen in FIG. 18, the counter-balance 1825 may serve to prevent an over rotation of the float arm 150 via its interference with the support member 190.

The vertical shaft 160 rotates in response to movement of the float 140. The rotation of the vertical shaft 160 drives the fluid stopping mechanisms of the stop-fill assembly 1810. Such mechanisms have been previously described with respect to other embodiments and therefore will not be repeated here. As will be shown in greater detail in subsequent drawings, the vertical shaft 160 also provides rotation of a magnet (FIG. 19) that drives the gauge dial assembly 1815.

Figure 19:
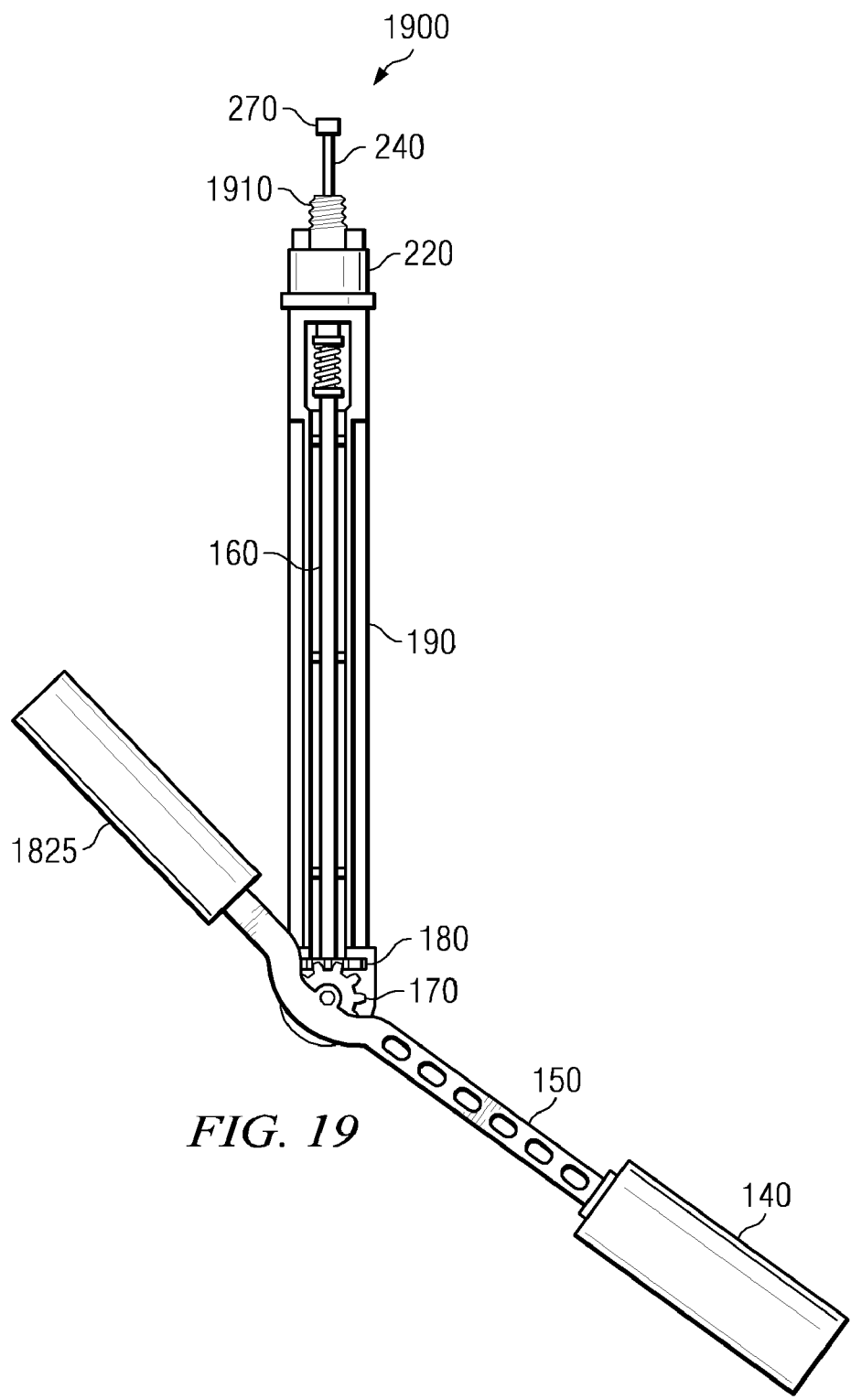
FIG. 19 is a side view of one embodiment of a stop-fill assembly in accordance with aspects of the present disclosure.

Referring now to FIG. 19, a side view of one embodiment of a stop-fill assembly suitable for use in a combination service valve stop-fill assembly is shown. The stop-fill assembly 1900 may be internally the same as those that have been previously described or it may be internally similar to those further described herein. In FIG. 19 an upper shaft 240 can be seen connecting to a magnet 270. A valve head 220 of the stop-fill assembly 1900 is provided with threads 1910. The threads 1910 provide a secure means allowing the stop-fill assembly 1900 to connect with the lower service valve port 1820 of the service valve assembly 1805.

Figure 20:
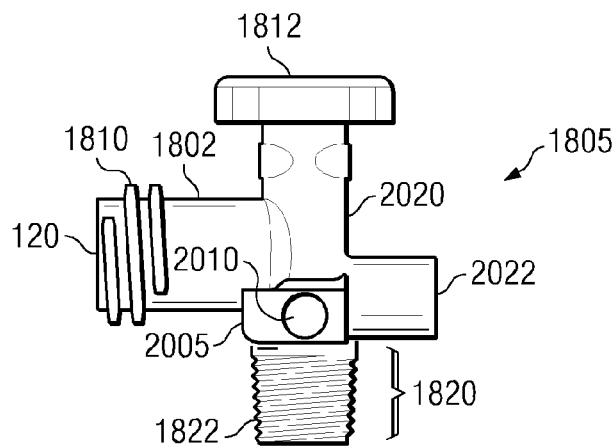
FIG. 20 is a side view of one embodiment of a service valve in accordance with aspects of the present disclosure.

Referring now to FIG. 20, a perspective view of one embodiment of a service valve suitable for use in a combination service valve stop-fill is shown. In FIG. 20 the service valve assembly 1805 is shown separated from the dial 1815 and the stop-fill assembly 1810. Once again, FIG. 20 illustrates the presence of the port 120 and tank connection 1820 which may be threaded with threads 1810 and 1822, respectively. As before, the service valve knob 1812 may be provided to allow opening and closing of the service valve assembly 1805. The service valve knob 1812 will typically sit atop the valve body 2020. The valve body 2020 also connects to the valve outlet 1802, the tank connection 1820, and a pressure relief valve 2022. With the dial 1815 removed, it can be seen that a set of wrench flats 2005 and 2205 (FIG. 22A) are provided on the service valve 1805 near the junction of the valve body 2020 and the tank connection 1820. In the view of FIG. 20, one of these wrench flats 2005 can be seen. The wrench flat 2005 is shown with a recess 2010 provided therein. In one embodiment the service valve 1805 is a standard, commercially available brass service valve. In such a case, the recess 2010 can be machined directly into the wrench flat 2005. Thus, with a relatively minor modification, a standard service valve 1805 can be adapted for use with aspects of the present disclosure. In some embodiments, the recess 2010 will be round but in other embodiments different shapes can be used. If a commercially available service valve is used, the depth of the recess 2010 relative to the wrench flat 2005 will be approximately 0.2 inches. As can be better appreciated from the drawings that follow, this will allow a dial magnet inserted sufficiently into the recess 2010 to interact with magnet 170 to provide readings on the gauge dial 1815. In other embodiments, magnets 270 and 2152 (FIG. 21B) are sufficiently strong that a recess 2010 is not needed.

Figure 21A:
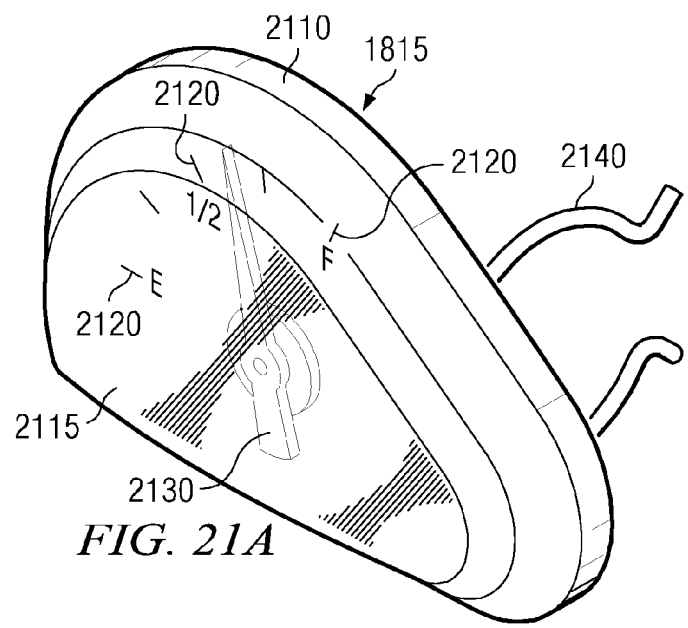
FIG. 21A is a front perspective view of one embodiment of a removable dial in accordance with aspects of the present disclosure.
Figure 21B:
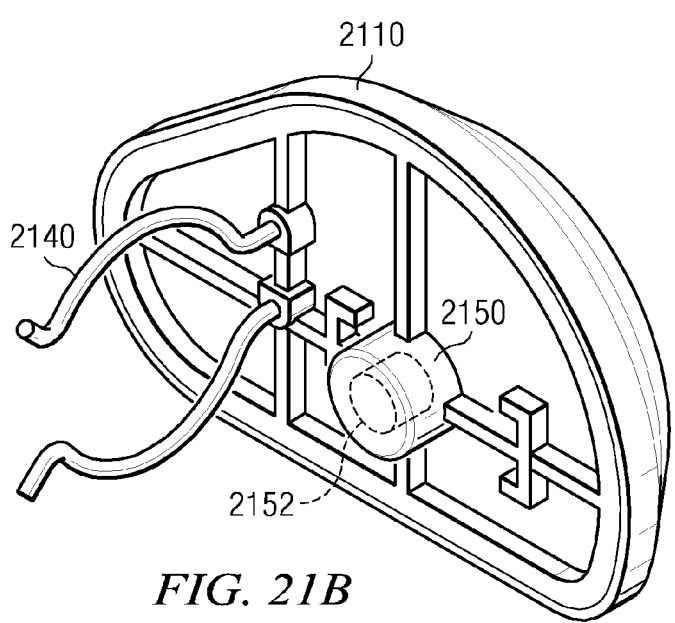
FIG. 21B is a rear perspective view of one embodiment of a removable dial in accordance with aspects of the present disclosure.

Referring now to FIG. 21A, a perspective view of the front side of one embodiment of a removable dial suitable for use in a combination service valve stop-fill apparatus in accordance with aspects of the present disclosure is shown. The dial 1815 provides a dial face 2110. The dial face 2110 may be molded plastic or another suitable material. A lens 2115 may be provided. The lens 2115 may be glass or plastic or another suitably transparent material. It can be seen that the lens 2115 provides protection for the pointer 2130 as well as the indicator markings 2120. The indicator markings 2120 may be painted or molded onto the dial face 2110. In the embodiment of FIG. 21A markings corresponding to empty, half-full and full are shown but in other embodiments other markings may be used. It can be seen that the lens 2115 provides clearance for the pointer 2130 to sweep along the dial face 2110 to point to or near the corresponding indicator markings 2120. The pointer 2130 is driven by an internal magnet 2152 (FIG. 21B). One or more spring clips 2140 may be seen protruding from the side of the gauge dial face 2110 opposite the pointer 2130. In some embodiments, the spring clip 2140 may be provided to aid in alignment and/or attachment of the dial 1815 to the service valve assembly 1805.

Referring now to FIG. 21B, a perspective view of the back side of one embodiment of a removable dial 1815 in accordance with aspects of the present disclosure is shown. FIG. 21B provides a view of the dial 1815 illustrating one possible placement of the spring clip 2140. The spring clip 2140 may be attached to the backside of the dial face 2110 by a number of means including, but not limited to, snap fittings, friction fittings, gluing or molding. In one embodiment, the spring clip 2140 may be molded from the same plastic as the dial face 2110. In other embodiments the spring clip 2140 may be another suitably resilient metal. Also protruding from the dial face 2110 on the backside is a dial magnet housing 2150. The dial-magnet housing provides clearance and covering for the magnet 2152 that drives the pointer 2130.

Figure 22A:
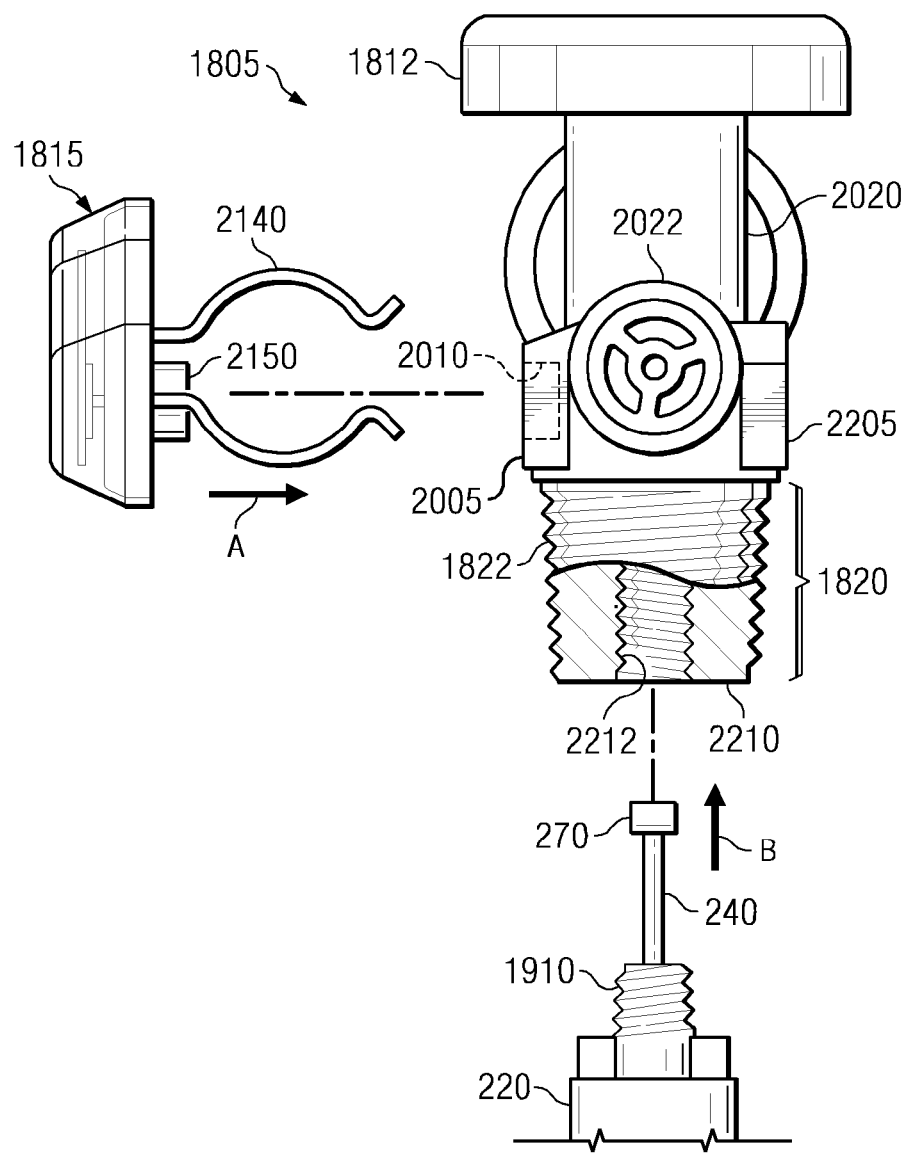
FIGS. 22A-B are rear views with partial cutaway showing an upper portion of a combination service valve, stop-fill assembly, and removable dial in accordance with aspects of the present disclosure.
Figure 22B:
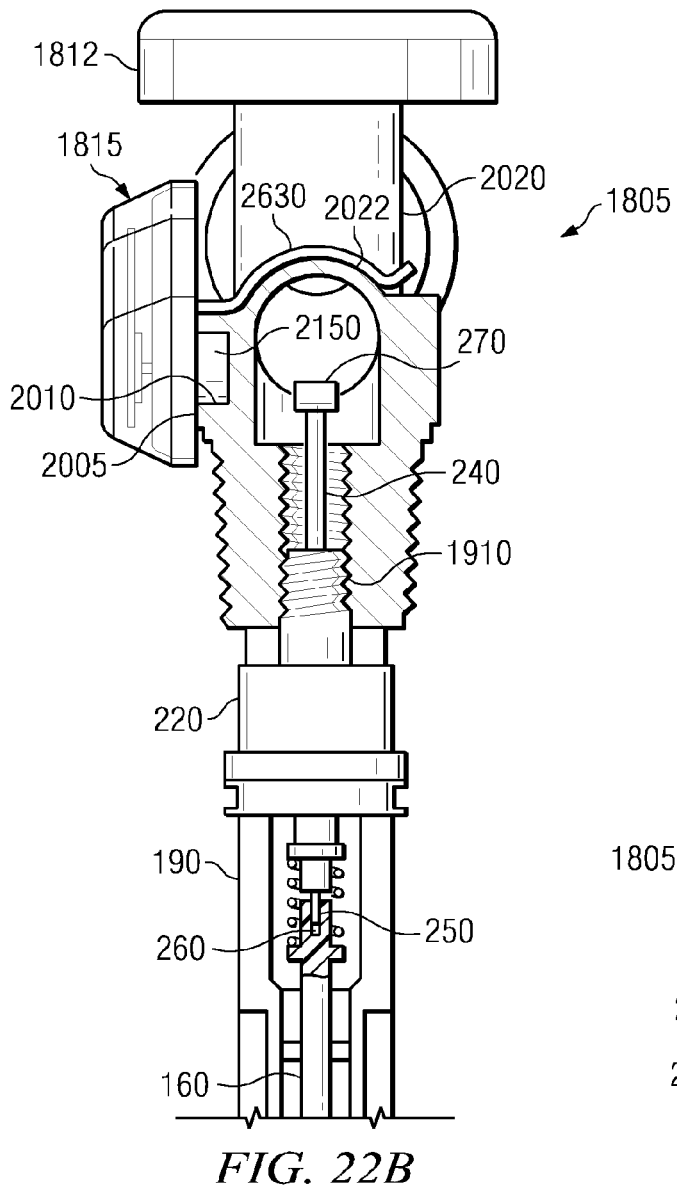

Referring now to FIGS. 22A and 22B, rear views with partial cutaways showing an upper portion of a combination service valve, stop-fill assembly, and removable dial in accordance with aspects of the present disclosure is shown. From the view of FIG. 22A it can be seen that the service valve assembly 1805 provides two wrench flats 2005 and 2205. It can also be seen from this view that the wrench flats 2005 and 2205 may provide parallel flat surfaces. The wrench flats 2005 and 2205 may be used to aid in the insertion of the valve assembly 1805 into a tank such as the tank 100 of FIG. 1. The recess 2010 is also shown in dotted line within the wrench flat 2005. A lower service valve throat 2210 is shown in outline and provides throat threads 2212.

From FIG. 22A, it can be seen how the various components of the assembly combination of FIGS. 22A and 22B may be assembled. It can be seen that the dial 1815 may be attached to the service valve 1805 by inserting the dial magnet housing 2150 securely into the recess 2010 on the wrench flat 2005. In some embodiments, the dial 1815 may be sufficiently secured to the service valve assembly 1805 by the friction between the dial magnet housing 2150 and the recess 2010. In other embodiments, spring clips such as shown in FIGS. 21A and 21B may be used to stabilize and/or sufficiently secure the dial 1815 to the service valve assembly 1805.

It can also be seen that the magnet 270 attached to the end of the upper shaft 240 can be inserted into the lower service valve throat 2210. In one embodiment, the threads 1910 of the valve head 220 may be adapted to interfit with the throat threads 2212 such that when the magnet 270 is inserted into the lower service valve throat 2210 as shown by the arrow B, the magnet 270 is in relatively close proximity to the magnet inside the dial magnet housing 2150. Rotation of the magnet 270 about a generally vertical axis (i.e., the axis of rotation of shaft 240) causes variations of the associated flux field about the vertical axis. This flux field interacts with the flux field associated with the dial magnet 2152 to cause rotation of the dial magnet about a generally horizontal axis (i.e., the axis of rotation of the dial pointer 2130). Thus, a rotation of the magnet 270 translates into movement of the pointer 2130. It can also be seen that the rotation of the shaft 240 and magnet 270 is substantially orthogonal to the direction of rotation of the dial pointer 2130. Thus, the axes need not necessarily be horizontal and vertical.

FIG. 22B shows the assembled combination of the service valve assembly 1805, the dial 1815, and the stop-fill assembly 1810. It can be seen that the dial 1815 is securely fastened to the service valve assembly 1805 by having had the dial magnet housing 2150 inserted into the recess 2010. As can be seen in the cutaway, the magnet 270 is rotatable in close proximity to the dial magnet housing 2150. As the magnet 270 rotates in response to movements of the float 140, such movements may be indicated on the face of the dial 1815 via magnetic interaction between the magnet 270 and the magnet contained within the dial 1815.

Figure 22C:
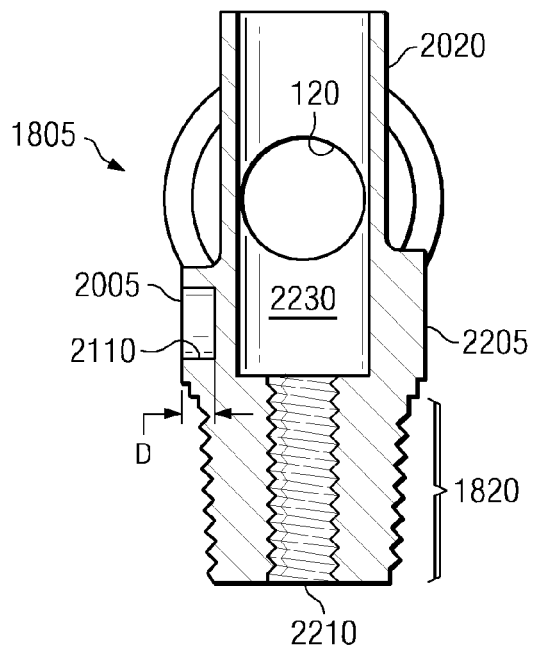
FIG. 22C is a cross section of a service valve modified for use with a removable dial in accordance with aspects of the present disclosure.

FIG. 22C is a cross section of a service valve 1805 modified for use with a removable dial in accordance with aspects of the present disclosure. The service valve 1805 in FIG. 22C is shown without the stop-fill assembly 1810, dial 1815, or knob 1812. The placement of the lower service valve throat 2210 relative to the wrench flats 2005 and 2205 can be seen from this view. It can also be seen that the lower service valve throat 2210 extends into an interior chamber 2230 of the service valve 1805. The interior chamber 2230 allows fluids and/or gases to pass from the port 120 to the lower service valve throat 2210. The service valve 1805, when fully assembled and operational, provides means that are known in the art for selectively allowing fluid and gaseous transfer from the port 120 through the lower service valve throat 2210. In one embodiment, the primary modification to the service valve 1805 includes machining or drilling a recess 2010 into one of the wrench flats 2005, 2205. In other embodiments, the recess 2010 could be cast directly into the service valve 1805, or created by other means. In the embodiment shown, the recess 2010 is prepared in the wrench flat 2005.

Figure 23:
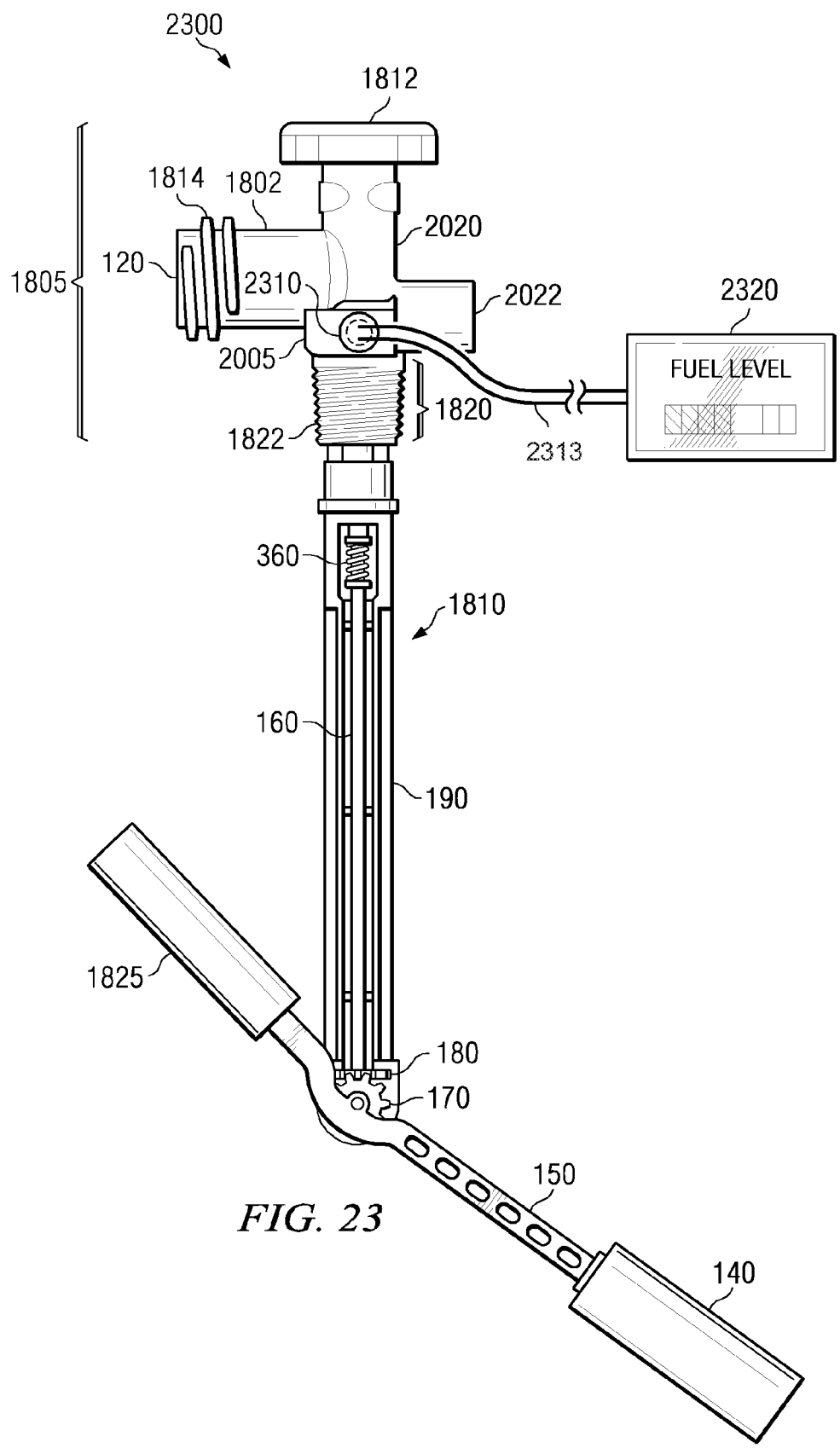
FIG. 23 is a side view of another combination service valve, stop-fill assembly, and remote level indicator in accordance with aspects of the present disclosure.

FIG. 23 is a side view of another combination service valve, stop-fill assembly, and liquid level indicator in accordance with aspects of the present disclosure. The combination 2300 is similar to the combination 1800 (FIG. 18) previously described. However, in place of the gauge dial 1815, the combination 2300 provides a magnetic field sensor 2310. The magnetic field sensor 2310 senses the intensity and direction of the magnetic field produced by the magnet 270 (FIG. 19). In one embodiment, the magnetic field sensor will be a two pole analog magnetic sensor such as the TESLA3 from the Asahi Kasei Corporation of Osaka, Japan. The magnetic field sensor 2310 may convey data corresponding to the position of the magnet 270 to a remote location. The field sensor 2310 could convey data wirelessly or may convey data through one or more electrical leads 2313, as shown. Two leads are shown but more or fewer could be used depending upon the field sensor 2310 being used.

A dial or indicator 2320 may provided at a remote location for viewing information corresponding to the position of the magnet 270. In one embodiment, the electrical signals provided wirelessly or via the leads 2313 will be processed into a liquid level reading such as a fuel level. Processing or signal conditioning may take place locally or remotely (e.g., at the sensor 2310 or at or near the indicator 2320). Although only a single reading is shown on the indicator 2320, in some embodiments, the indicator 2320 will provide readouts from multiple locations or gauges. The readout on the indicator 2320 is shown in a digital format but could also be in an analog format, possibly similar in appearance to the gauge dial 1815 (FIG. 18).

Figure 24A:
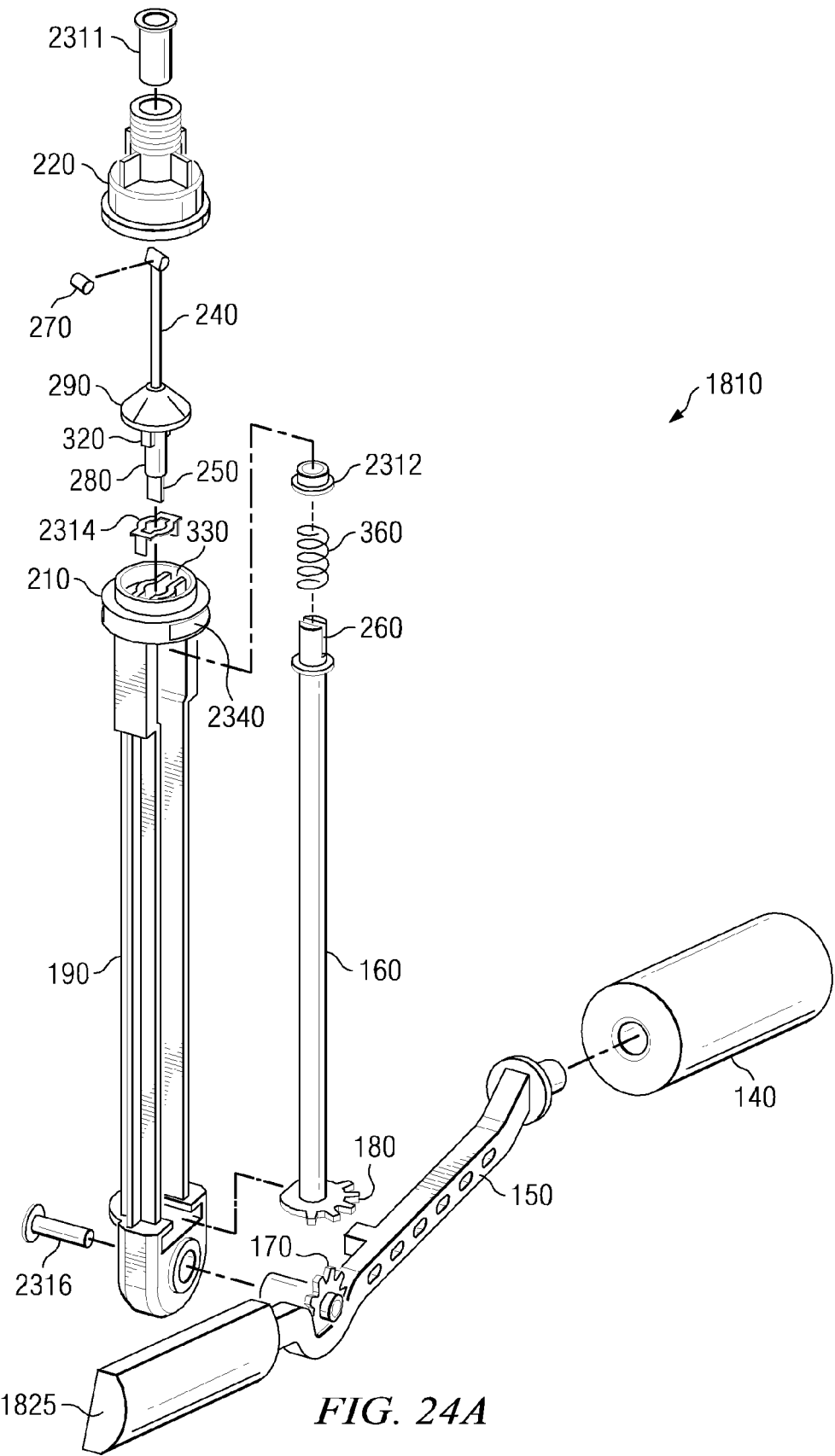
FIG. 24A is an exploded view of a stop-fill assembly in accordance with aspects of the present disclosure.

FIG. 24A is an exploded view of a stop-fill assembly in accordance with aspects of the present disclosure. The stop-fill assembly 1810 may be used in a combination device such as those shown in FIGS. 18-19. The stop-fill assembly 1810 is similar in some respects to the stop-fill assemblies previously described herein. A support member 190 is provided with a vertical shaft 160 disposed within. A float arm 150 is connected to the support member 190 so as to be able to rotate thereon. An eyelet 2316 may be provided as a fastener between the support member 190 and the float arm 150. The float arm 150 is also connected at opposite ends to a float 140 and a counter balance 1825. Rotation of the float arm 150 about the base of the support member 190 causes the vertical shaft 160 to rotate about the longitudinal axis of the vertical shaft 160. The rotation of the float arm 150 may be translated to the rotation of the vertical shaft 160 by a sector gear 170, fixed to the proximal end of the float arm 150 that engages a pinion gear 180, fixed to the lower end of the vertical shaft 160.

The stop-fill assembly 1810 also includes a valve body 210 and a valve head 220. A shuttle body 290 serves as a blocking member for blocking fluid flow. An upper shaft 240 extends upwardly from the shuttle body 290 through the valve head 220. If desired, an eyelet 2311 may be provided for increasing the durability or structural integrity of the valve head 220. A magnet, 270 that serves as an indicator driving member, is fixed to an upper end of the upper shaft 240. A tab 250 is formed below the shuttle body 290 on a lower shaft 280. The tab 250 interfits with the slot 260 of the vertical shaft 160 in order to transmit rotary motion of the vertical shaft 160 to the shuttle body 290. The tab 250 may be free to slide vertically within the slot 260 such that the lower shaft 280 and connected shuttle body 290 can move vertically independent of the vertical shaft 160. The lower shaft 280 also includes an opposing pair of release ribs 320 for engaging with an opposing pair of release slots 330 formed in the valve body 210 when the stop-fill assembly 200 is in a closed position. A bearing clip 2314 may be provided between the valve body 210 and the release ribs 320 to increase the durability and decrease the friction of the contact between the release ribs and the valve body. The bearing clip 2314 may be composed of a metal, a low friction plastic, a polymer, or other substance.

The stop-fill assembly 1810 can transition between an open position and a closed position. In the open position, fluid (e.g., from the port 120) can flow through the stop-fill assembly 1810, while in the closed position fluid is prevented from flowing through the stop-fill assembly 1810.

In the open position, and under the pressure of incoming fluid pressing downward on the shuttle body 290, the release ribs 320 of the valve shuttle 230 ride against the upper surface of the valve body 210 or the bearing clip 2314. Thus, the release ribs 320 keep the stop-fill assembly 200 open against the force of a fluid flow (e.g., from the port 120). When the float arm 150 is rotated to the position corresponding with an empty condition, the release ribs 320 are at 90 degree angles to the slots 330, sitting on the upper surface of the valve body 210 so that the valve shuttle body 290 cannot go down. In this configuration, fluid travels downward through the space between the upper shaft 240 and the valve head 220, around the shuttle body 290, through fill ports 410 and out through ports 2340 formed through the sides of valve body 210.

Figure 24B:
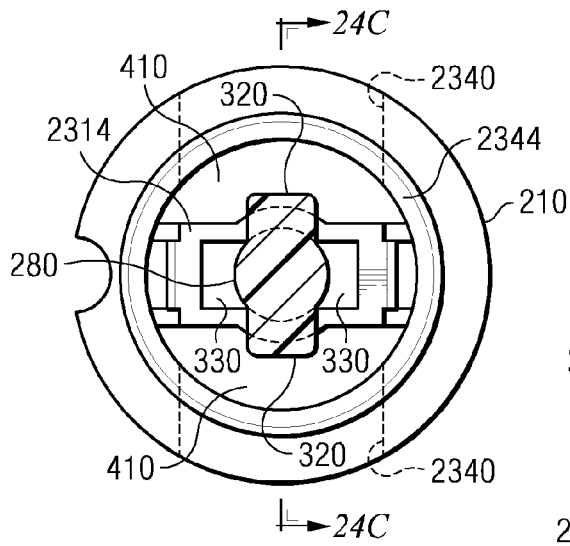
FIG. 24B is a partial top view of the valve body of the stop-fill assembly of FIG. 24A.
Figure 24C:
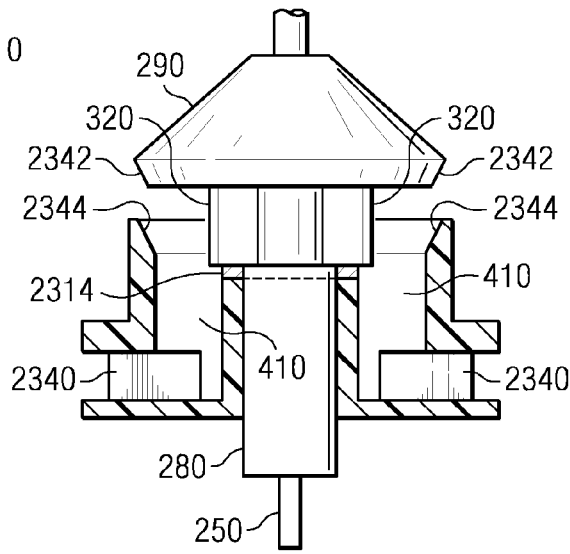
FIG. 24C is a partial sectional and cutaway view of the shuttle body and valve body of FIG. 24A.

FIG. 24B is a partial top view of the valve body 210 of FIG. 24A with release ribs 320 at 90 degree angles to slots 330, sitting on the surface of valve body 210 (and bearing 2314) so that the valve shuttle body is in the open position. FIG. 24C is a partial sectional and partial cutaway view of the shuttle body 290 engaged in the valve body of FIG. 24A. In the open position, fluid travels downward through the space between the upper shaft 240 and the valve head 220, around the shuttle body 290 and through discharge ports 2340 formed in valve body 210 and into the container (e.g., tank 100). In this variation, ports 2340 direct fluid entering tank 100 through the stop-fill device 1800 radially away from a central longitudinal axis of tank and likewise away from shaft 160. Discharging fluids through radially directed ports 2340 reduces the amount of turbulence generated in tank 100 during the filling operation along with possible impingement of the fluid onto float 140 or float arm 150 which can interfere with the operation of the float.

As the vertical shaft 160 rotates due to the motion of the float arm 150, the shuttle body 190 rotates and eventually rotates to the closed position. When this happens, the downward pressure of the fluid flow, which is sufficient to overcome the opposing pressure of the spring 360, causes the release ribs 320 to drop through the bearing clip 2314 and into the release slots 330. The shuttle body 290 then acts as a blocking member. As shown in FIG. 24C, a beveled circumferential surface 2342 of shuttle body 290 seats against a corresponding beveled surface or seat 2344 of valve body 210 to block the flow of fluid through the stop-fill assembly 1810. Notably, the movement of shuttle body when release ribs 320 move into alignment with release slots 330 is longitudinally independent of the rotation of vertical shaft 160. In other words, the shuttle body 290 can move up and down in the longitudinal direction even though the vertical shaft 160 is fixed in the longitudinal direction, while at the same time the shuttle body remains rotationally engaged with the vertical shaft such that the shuttle body and vertical shaft always rotate together. Thus, shuttle body 290 rotates in response to the rotation of shaft 160, but translates longitudinally independent of shaft 160 when moving between the open and closed positions.

In the embodiment shown, a separate spring clip 2312 (FIG. 24A) is provided for stabilizing the spring 360 against the valve body 210 and for preventing binding of the spring when the vertical shaft 160 rotates. The relatively short distance that the shuttle body 290 travels when moving into the closed position means that the vertical translation of the magnet 270 is also relatively small. Therefore the magnetic field produced by the magnet 270 does not change substantially, and thus the movement of the magnet 270 along the axis of the stop-fill assembly 1810 has no substantial bearing on the interaction of the magnet 270 and the pointer magnet 2152. It is the rotational movement of the magnet 270 that produces a change in the magnetic flux field that may be recognizable by the dial 1815 as a change in the fluid level of the tank 100.

Once the stop-fill assembly 1810 is in the closed position, filling is halted. The source of the incoming fluid is disconnected from the port 120 or the port 120 is closed. At this point, since there is no longer any pressure against the upper side of the valve shuttle body 290, the valve shuttle body 290 is moved upward under the force of the spring 360 so that the stop-fill assembly 1810 transitions to the open position. This allows for fluid or gas to exit the tank 100 by traveling back up through the stop-fill assembly 1810 to the port 120.

In some cases there may be relatively high pressures against the shuttle body 290 due to the filling pressure and the fluid flow. The actual flotation or the buoyancy of the float 140 produces a relatively small torque, so friction between the release ribs 320 and the upper surface of the valve body 210 might be high and resist rotation of the shuttle body 290. For this reason, as has been described, low fiction materials may be selected for the construction of the release ribs 320, valve body 210, and other components. Furthermore a bearing clip 2314 may be employed to both decrease friction and increase durability. Additionally, flow surfaces may be provided on the shuttle body 290 such that pressure of the incoming fluid assists in the rotation of the valve shuttle body 290. As has been described, the shape of the shuttle body 290 may be chosen such as to assist in its own rotation.

Figure 24D:
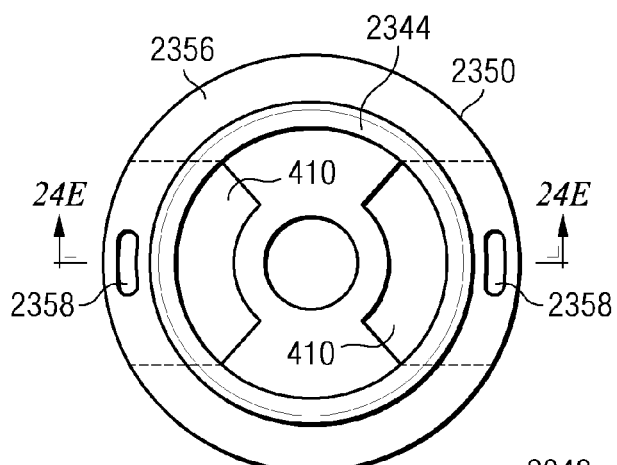
FIG. 24D is a partial top view of an alternate valve body for the stop-fill assembly of FIG. 24A.
Figure 24E:
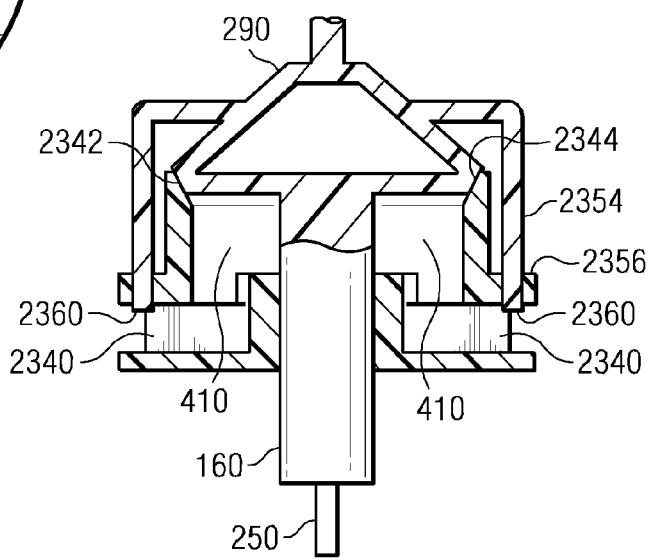
FIG. 24E is a partial sectional and cutaway view of the alternate shuttle body and valve body for the stop-fill assembly of FIGS. 24A and 24D.

FIG. 24D is a top view of an alternate valve body 2350 and FIG. 24E is a partial cutaway and partial sectional view of a corresponding shuttle body 2352. In this variation, release ribs 320 have been replaced with a pair of release arms 2354 that extend outward from an upper surface of shuttle body 2352 and downward to a surface 2356 of valve body 2350 outside of beveled valve seat 2344. A pair of release apertures 2358 formed in surface 2356 receive the distal ends 2360 of arms 2354, permitting the shuttle body to move downward when arms 2354 are moved into alignment with apertures 2358.

In the open position, ends 2360 of arms 2354 rest on surface 2356, holding shuttle body 2352 up so that fluid may past the shuttle body through fill ports 410 and into tank 100 through radially directed discharge ports 2340. As the vertical shaft 160 rotates due to the motion of the float arm 150, the shuttle body 2352 rotates and eventually rotates to the closed position. When this happens, the downward pressure of the fluid flow, which is sufficient to overcome the opposing pressure of the spring 360, causes the ends 2360 of release arms 2354 to drop into release apertures 2358. Shuttle body 2352 moves down with beveled circumferential surface 2342 of shuttle body 2352 seating against the corresponding beveled surface 2344 of valve body 2350 to block the flow of fluid through the stop-fill assembly 1810.

Figure 24F:
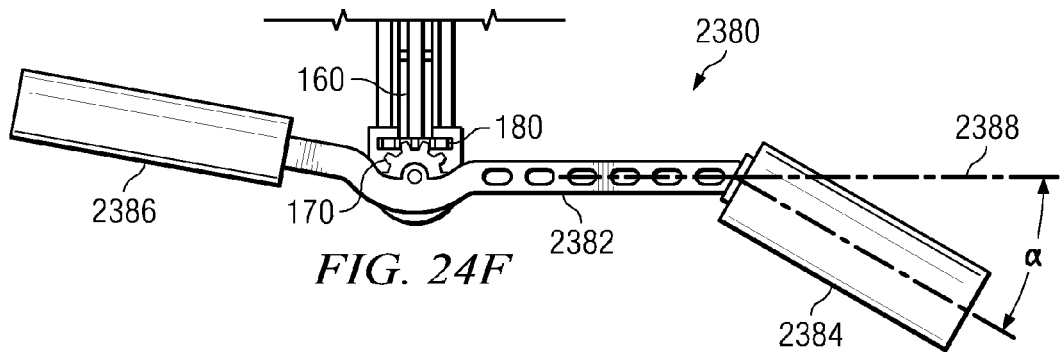
FIG. 24F is a partial side view of an alternate float assembly for use in connection with the stop-fill assembly of FIG. 24A.

FIG. 24F is a side view of an alternate float assembly 2380 for use with stop-fill assembly 1810. Float assembly 2380 includes a float arm 2382, a float 2384 attached to a first end of arm 2382 and a counterweight or counterbalance 2386 attached to a second end of arm 2382. Float arm 2382 is operatively connected to a sector gear 170 which drives pinion gear 180 that is attached to vertical shaft 160.

In the embodiment illustrated in FIG. 24F, float 2384 is mounted on arm 2382 such that the float is offset from the longitudinal axis of the float arm such that a longitudinal axis of the float extends below the float arm when the float arm is in a horizontal orientation. In one embodiment, float 2384 is slanted downward at an angle α from about 10 degrees to about 45 degrees relative to a longitudinal axis 2388 of arm 2382. It was found that angling float 2384 relative to the longitudinal axis of arm 2382 in this manner improved the efficiency of the float and increased the sensitivity of the assembly to changes in liquid level in tank 100 at near full volumes or at volumes where the angle of the longitudinal axis 2388 of arm 2382 relative to horizontal approaches 90 degrees. In another variation, float 2384 may be offset from the longitudinal axis of arm 2384 by forming a bend in the arm adjacent to the float, offsetting the float on the arm or using an extension of the arm that offsets the float.

Figure 24G:
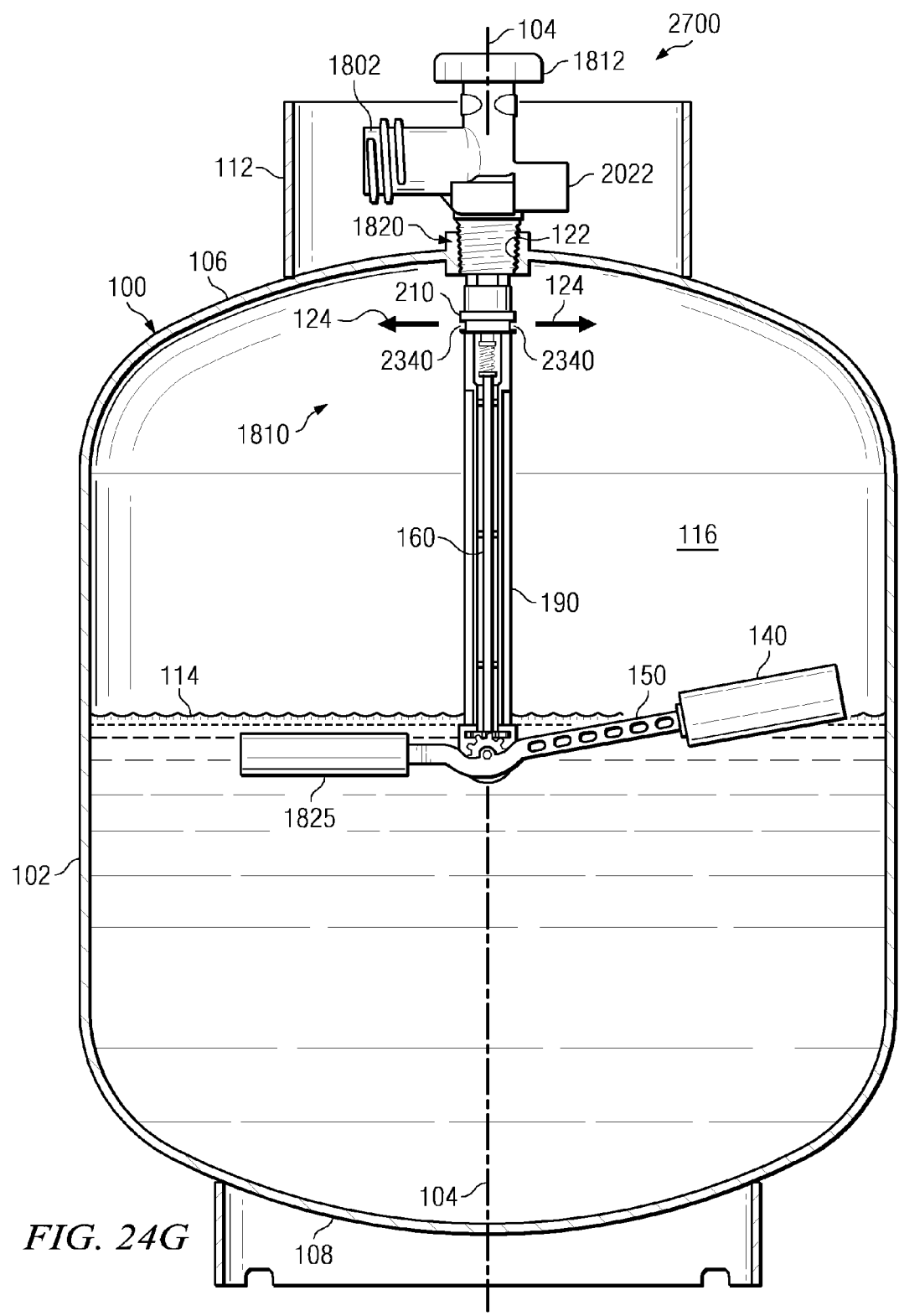
FIG. 24G is a partial sectional view illustrating the stop-fill assembly of FIG. 19A positioned in a tank in accordance with aspects of the disclosure.

FIG. 24G is a partial sectional view illustrating the stop-fill assembly 1810 of FIG. 24A positioned in pressurized tank 100. As illustrated tank 100 includes a cylindrical sidewall 102 defining a central axis 104 extending therethrough, a generally semi-cylindrical top wall 106, a generally semi-cylindrical bottom wall 108 and a shield 112 extending at least partially around a service valve 2700 suitable for use in connection with stop-fill devices described herein. In one embodiment, service valve 2700 includes a valve inlet/outlet 1802 through which tank 100 is filled and emptied, a relief valve 2022, and a threaded tank connection 1820 that is screwed into a threaded opening 122 in top wall 106 of the tank. Typically, tank 100 will have only one such opening 122 through which the tank is filled and emptied. Since tank 100 is filled and emptied through opening 122, stop-fill assembly 1810 must function as a two way valve as described herein.

Referring still to FIG. 24G, a handle 1812 is provided for opening and closing service valve 2700. Tank 100 is suitable for containing a pressurized fluid 114 such as liquefied natural gas (LNG), liquefied propane and/butane and similar volatile liquefied gases commonly used for cooking and heating. Tank 100 may be filled with such liquefied gases through service valve 2700 and stop-fill assembly 1810 which blocks flow of the liquefied gas when the amount of fluid 114 reaches a predetermined level corresponding to a desired volume of pressurized fluid 114 in tank 100 and then reopens when the fill source is disconnected and pressure across the stop-fill assembly is equalized such that spring 360 (FIG. 19A) forces shuttle body 290 upwardly, opening the stop-fill assembly. Gases 116 vaporized from pressurized fluid 114 are released through service valve 2700 which is typically connected to a gas grill, stove, heater or similar device with suitable tubing or pipe.

In the illustrated embodiment, pressurized fluid 114 entering tank 100 flows through radially directed ports 2340 which direct fluid entering the tank away from longitudinal axis 104 of tank 100 in the direction of arrows 124. In this manner, the amount of turbulence generated on the surface of the fluid 114 in tank 100 during the filling operation is reduced. Possible direct impingement of fluid 114 onto float 140, float arm 150 and/or counter balance 1825 is eliminated or substantially reduced. Reducing surface turbulence and/or impingement on the float arm reduces the likelihood of premature activation of the stop-fill device, which could result in incomplete filling.

Figure 25:
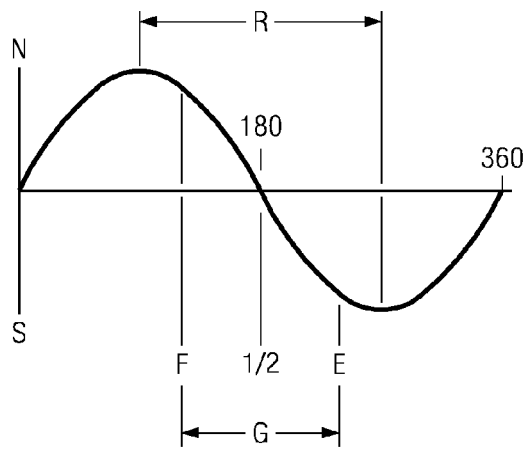
FIG. 25 is a diagram illustrating one possible correlation between the magnetic field produced by an indicator magnet and a dial pointer reading or indicator according to aspects of the present disclosure.

FIG. 25 is a diagram illustrating one possible correlation between the magnetic field produced by an indicator magnet and a dial reading according to aspects of the present disclosure. Relative field intensities (in both N and S) and directions correspondent to degrees of rotation of the magnet 270 from a starting point are labeled for illustration. Referring also back to FIGS. 19 and 24, it can be seen that the orientation of the magnet 270 changes in response to a level of the float 140 on the float arm 150. The magnet 270 will have a north pole and a south pole and will produce a magnetic field in proximity thereto that will vary in strength and direction. The float arm 150 and pinion gear 180 can be configured to provide a rotation of the magnet 270 starting from a known position (e.g., empty) and proceeding to another known position (e.g., full) in a known ratio. Thus the magnetic field direction and strength produced by the magnet 270 as it takes on various propositions between open and closed can be known and used to calibrate a dial 1815 or magnetic field sensor 2310. The diagram of FIG. 25 illustrates that in one embodiment, only a portion of the field strengths and directions possible from the magnet 270 may be used in order to simplify calibration and readings. The direction (e.g., north or south) and relative field strength produced in known location near the magnet 270 as it is rotated in graphed. It can be seen that within particular range R, the magnetic field strength and direction takes on each possible value or a subset of possible values only once. By selection of the gearing ratio of the gears 170 and 180 and the size and shape of the float arm 150 and float 140, the range R, or in the present embodiment, subset thereof, G, may be used over the range of possible fluid levels in the container (e.g., tank 100). Possible markings for a gauge dial or other indicator corresponding to the field values over the range G are shown in FIG. 25 for illustration.

Figure 26:
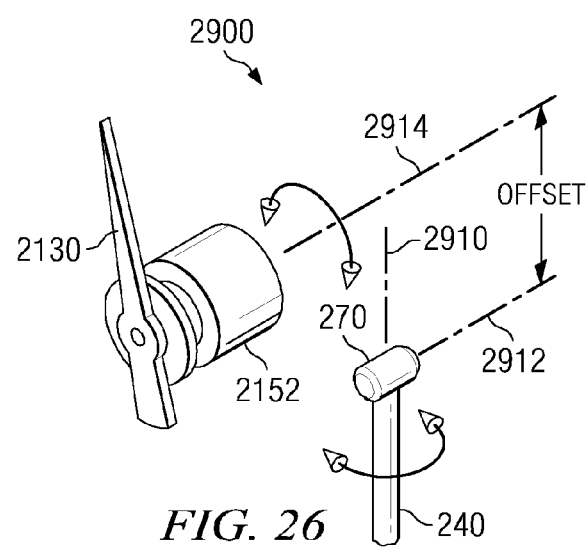
FIG. 26 is a side view illustrating the spatial relationship between a gauge magnet and a dial magnet in accordance with aspects of the present disclosure.

Referring now to FIG. 26, a side view 2900 of the spatial relationship between a gauge magnet and a dial magnet according to aspects of the present disclosure is shown. The diagram 2900 could correspond to the relationship between the magnet 270 and the pointer magnet 2152 when in use with any of the gauge and dial combinations described herein, whether a stop-fill device is included in the combination or not. It can be seen that the magnet 270 attached to the upper shaft 240 and rotates about the axis 2910 of the shaft 240. As the magnet 270 rotates, a plane 2912 is defined. In the two-dimensional view of FIG. 29, the plane 2912 is represented in dotted line. As has been described, a rotation of the magnet 270 about its axis 2910 causes a corresponding rotation of the pointer magnet 2152 about its axis 2914. It can be seen here that the axes 2910 and 2914 are generally orthogonal. In some embodiments or applications, one axis will be vertical while the other is horizontal but this is not required. However, in some embodiments, an offset between the plane of rotation 2912 of the magnet 270 and the axis 2914 of rotation of the pointer magnet 2152 will be provided. This allows increased leverage in the magnetic flux between the magnets 270 and 2152 to ensure adequate rotation of the pointer magnet 2152 by the magnet 270. The offset can vary by application and depending upon the range of motion needed in the pointer 2130. The offset could also be in either direction i.e., above or below the axis 2914 along the shaft axis 2910.

Figure 27:
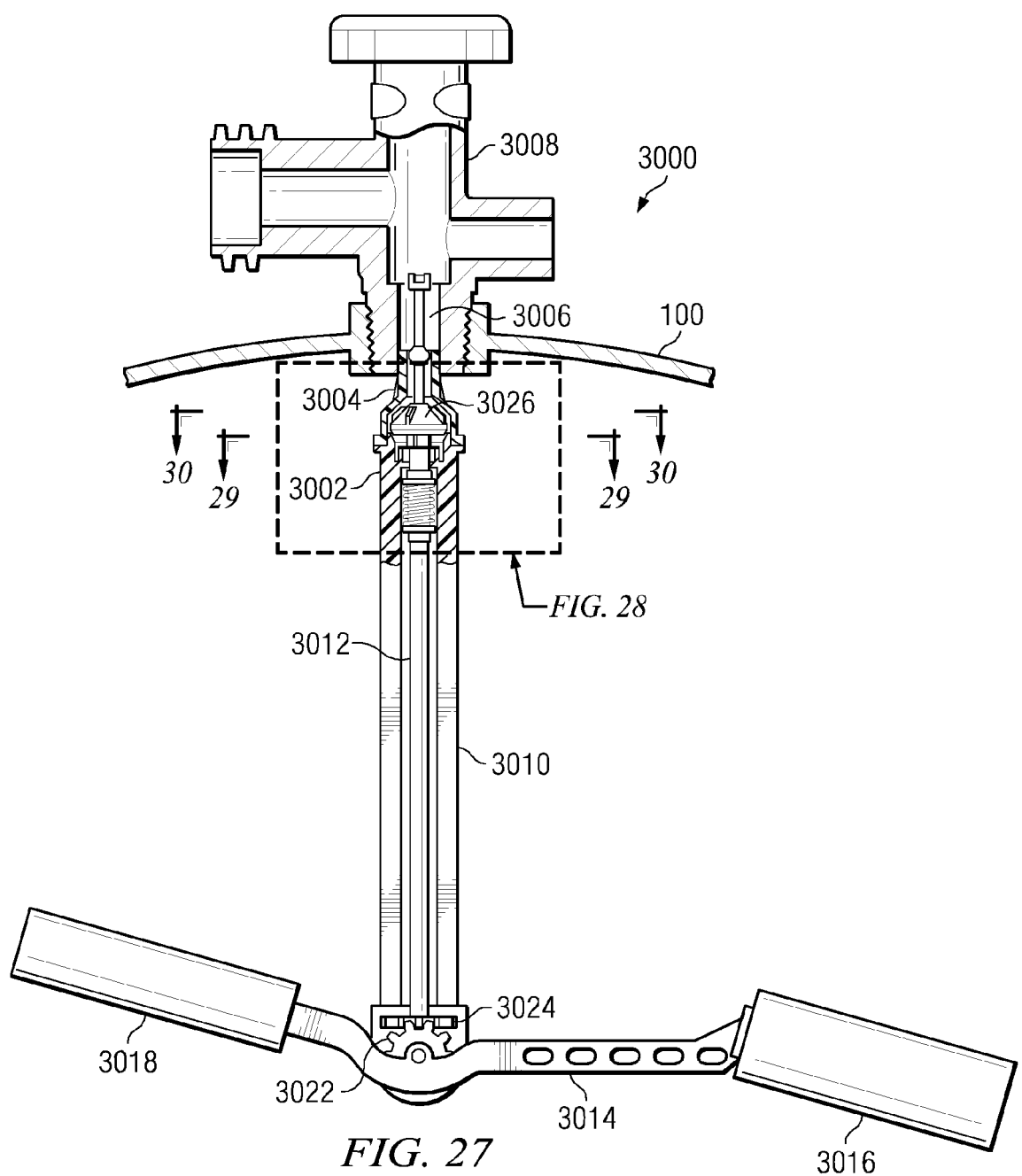
FIG. 27 is partial sectional, partial cut-away view of a combination stop-fill assembly in accordance with aspects of the present disclosure.

FIG. 27 is a partial section, partial cut-away view of a combination gauge and stop-fill valve assembly 3000 suitable for use with a tank such as tank 100 (FIG. 24G) containing a pressurized fluid such as liquefied natural gas (LNG), liquefied propane and/butane and similar volatile liquefied gases commonly used for cooking and heating. Stop-fill valve assembly 3000 includes a valve body 3002 and a valve head 3004 configured to extend into the lower throat 3006 of a service valve 3008. Valve head 3004 and throat 3006 may be provided with threads (not shown) for connecting stop-fill assembly 3000 to the service valve. A support member 3010 extends downwardly from valve body 3002 with a vertical shaft 3012 rotatably disposed within the support member. A float arm 3014 is connected to the distal end of support member 3010 for rotation about the distal end of the support member in response to changes in the fluid level in tank 100.

A float 3016 is connected to a first end of float arm 3014 with a counterbalance 3018 attached to a second end of the float arm remote from the float. Float 3016 moves in response to changes in the fluid level in tank 100, causing float arm 3014 to rotate around the distal end of support member 3010. Rotation of float arm 3014 is transmitted to vertical shaft 3012 by means of a sector gear 3022 attached to the float arm that engages a pinion gear 3024 mounted on the distal end of vertical shaft 3012 to rotate the shaft. The upper or proximate end of vertical shaft 3012 engages valve shuttle 3026, e.g., by means of the tab-and-slot arrangement shown in FIG. 24A, to rotate the shuttle in response to changes in the fluid level in tank 100.

Figure 27A:
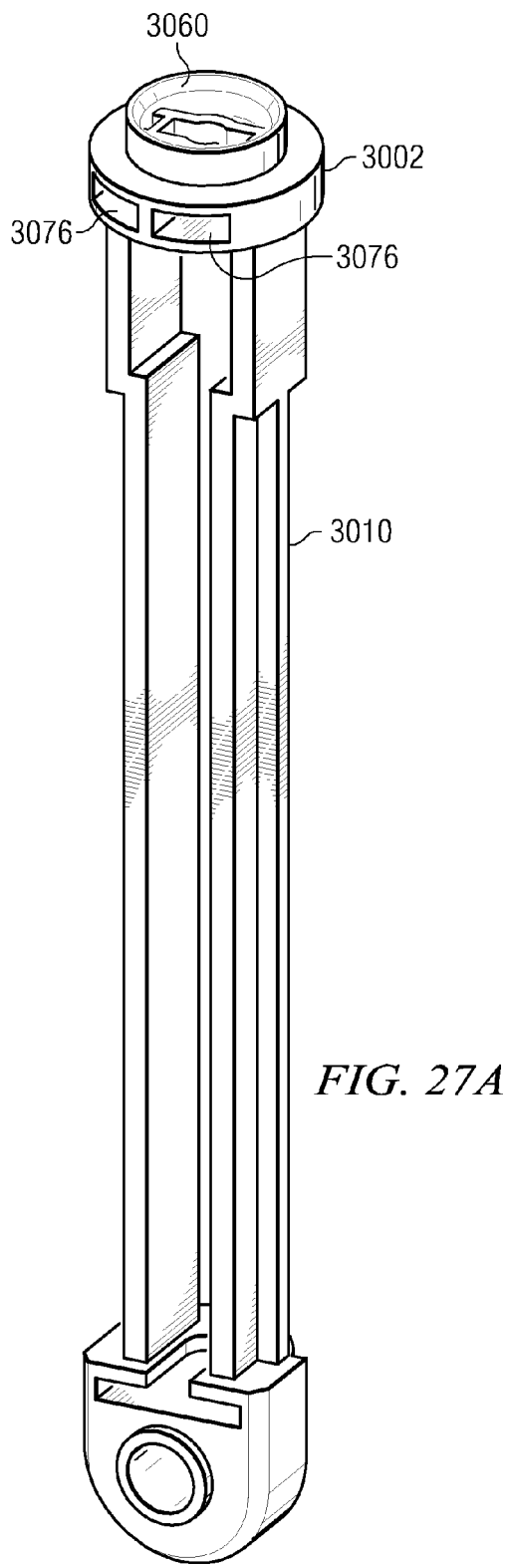
FIG. 27A is a perspective view of the valve body and support member of the stop-fill assembly of FIG. 27.
Figure 27B:
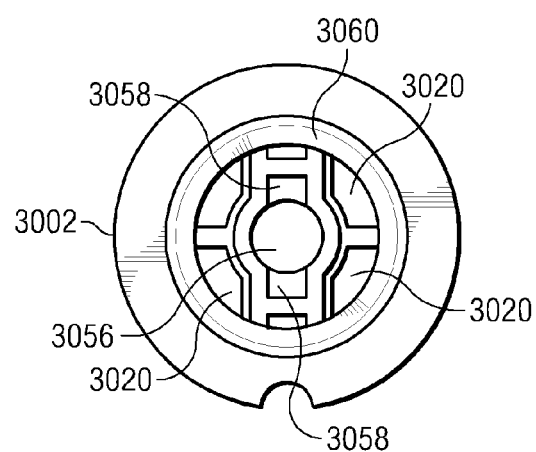
FIG. 27B is a top view of the valve body of the stop-fill assembly of FIG. 27.

As best illustrated in FIGS. 27A and 27B, valve body 3002 includes fill ports 3020 that communicate with radial ports 3076 to allow fluid to flow into and out of tank 100. In one variation, radial ports 3076 are directed radially away from and generally perpendicular to the longitudinal axis of support member 3010 to direct fluid entering tank 100 away from float 3016, float arm 3014 or counterbalance 3018. The radial orientation of ports 3076 prevents or minimizes impingement of fluid entering tank 100 on float 3016, float arm 3014 or counterbalance 3018 and/or turbulence that may interfere with the operation of stop-fill assembly 3000.

Figure 28:
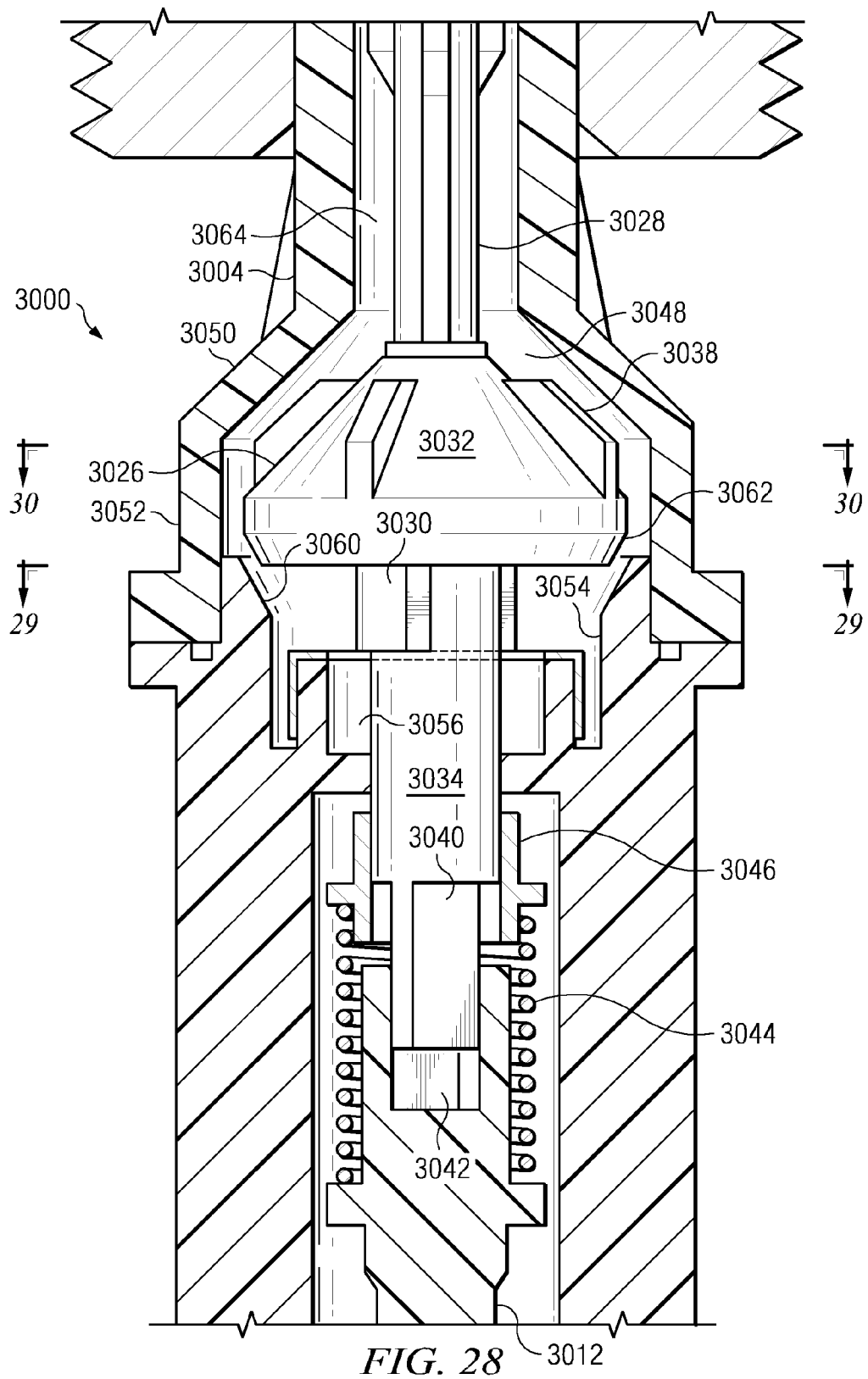
FIG. 28 is an enlarged portion of FIG. 27 enclosed by dashed lines in FIG. 27.
Figure 31:
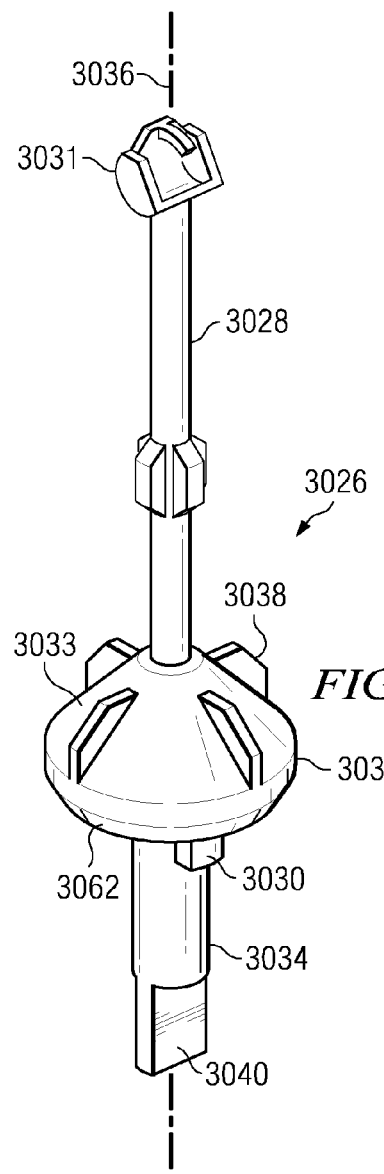
FIG. 31 is a perspective view of the valve shuttle of the stop-fill assembly of FIG. 27.

Referring to FIGS. 28 and 31, valve shuttle 3026 includes an upper shaft 3028 with a magnet holder 3031 formed on the distal end of the upper shaft, a shuttle body 3032 and a lower shaft 3034. Upper and lower shafts 3028, 3034 each extend along a longitudinal axis 3036 of valve shuttle 3026. Shuttle body 3032 includes a generally conical upper wall 3033 with a plurality of ribs 3038 extending outwardly from the upper wall. A pair of release ribs 3030 extend radially outward from the proximate end of lower shaft 3034 and downwardly from shuttle body 3032. Release ribs 3030 bear against valve body 3002 to support valve shuttle 3026 when stop-fill assembly 3000 is in the open position. A tab 3040 formed at the distal end of lower shaft 3034 engages a corresponding slot 3042 formed in the upper end of vertical shaft 3012 to transmit rotation (but not vertical motion) of the vertical shaft to valve shuttle 3026. A spring 3044 disposed around the proximate end of vertical shaft 3012 biases valve shuttle 3026 upwardly away from the vertical shaft. A spring clip 3046 prevents spring 3044 from binding as vertical shaft 3012 and shuttle body 3032 rotate.

Figure 33:
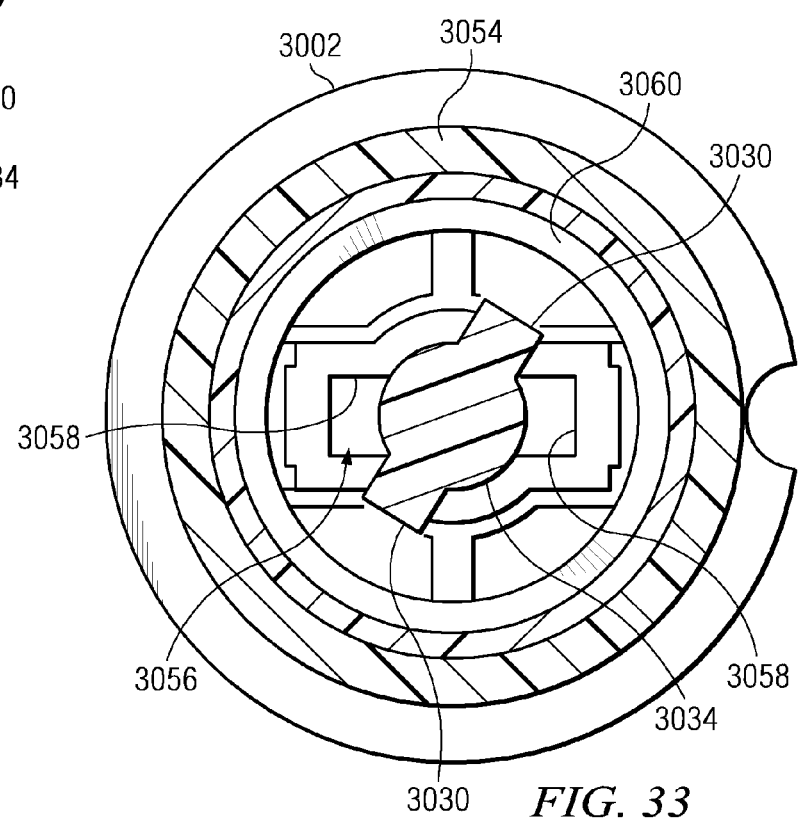
FIG. 33 is an enlarged view of the portion of FIG. 29 enclosed in dashed lines.

As best illustrated in FIG. 28 valve shuttle 3026 is disposed on valve body 3002 with upper shaft 3028 positioned in valve head 3004. Shuttle body 3032 is positioned inside a valve chamber 3048 including an upper, generally conical wall 3050, a cylindrical side wall 3052 and a bottom wall 3054. In one variation, ribs 3038 act as stops, limiting upward travel of shuttle body 3032 in valve chamber 3048 by contacting conical wall 3050 of the chamber. As best illustrated in FIG. 33, a passage 3056 formed through bottom wall 3054 has opposed release slots 3058 extending therefrom for receiving release ribs 3030 when valve shuttle 3026 rotates to a position where the release ribs are aligned with the release slots. Lower shaft 3034 extends through a central portion of passage 3056 to engage the proximate end of vertical shaft 3012. A beveled sealing surface or valve seat 3060 formed in bottom wall 3054 seals against a corresponding beveled sealing surface 3062 (FIG. 31) that extends circumferentially around the lower edge of shuttle body 3032 when shuttle body 3032 translates into the closed position. In one variation, the distance between valve seat 3060 and sealing surface 3062 when stop-fill assembly 3000 is in the open position may be determined by the length of release ribs 3030 that support valve shuttle 3026.

Referring to FIGS. 27 and 28, stop-fill assembly 3000 operates in essentially the same manner as described in connection with embodiments disclosed above. Service valve 3008 is connected to a source of LNG or LPG and opened. The LPG flows through service valve 3008 into an annular space 3064 between valve head 3004 and upper shaft 3028 and into valve chamber 3048. The LPG flows around shuttle body 3032, between valve seat 3060 and sealing surface 3062 and through fill ports 3020, discharging into tank 100 through radial ports 3076. As tank 100 fills, lifting float 3016, float arm 3014 rotates around the distal end of support member 3010. Sector gear 3022 rotates with float arm 3014, turning pinion gear 3024 and vertical shaft 3012. Valve shuttle 3026 rotates with vertical shaft 3012 until release ribs 3030 move into alignment with release slots 3058. When release ribs 3030 are aligned with release slots 3058, the downward force on valve shuttle 3026 exerted by LPG flowing over shuttle body 3032 overcomes the biasing force of spring 3044, causing the shuttle to translate longitudinally with the release ribs entering the release slots. Sealing surface 3062 of shuttle body 3026 moves into abutment with valve seat 3060, closing off the flow of LPG through stop-fill assembly 3000. When service valve 3008 is closed and/or the downward force on valve shuttle 3026 removed, spring 3044 pushes the valve shuttle up, returning the valve to the open position.

Stop-fill valve 3000 relies on the force exerted on valve shuttle 3026 to close the valve when a fluid in the tank such as LNG or LPG reaches a predetermined level, for example 80% of the capacity of the tank. The force applied to valve shuttle 3026 is therefore dependent upon the rate of fluid flow and the differential pressure across the valve. However, LPG is a volatile material having a vapor pressure that varies considerably with temperature. For example the vapor pressure of 100% propane varies from 24.5 psig at 0 degrees F. to approximately 177 psig at 100 degrees F. Consequently, the pressure differential across stop-fill valve 3000 when filling tank 100 with LPG may vary considerably depending upon factors such as ambient temperature, pump pressure and the composition of the LPG (e.g., % propane). In view of these variations, it is desirable that stop-fill valve 3000 close quickly and reliably at relatively low differential pressures across the valve.

Figure 32:
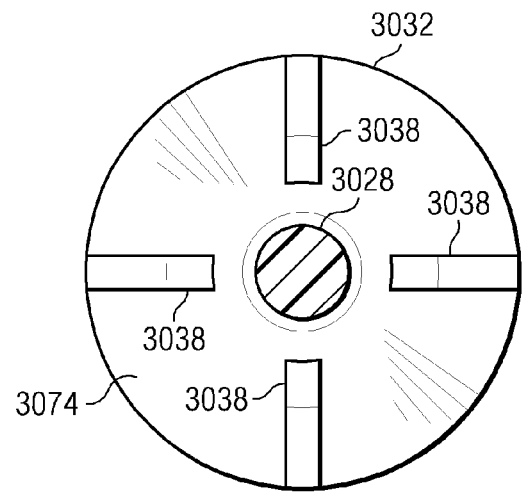
FIG. 32 is a top view of the valve shuttle of FIG. 31.

Referring now to FIGS. 29, 30 and 33, in one variation, stop-fill valve 3000 is configured with a maximum upper flow area 3070 when the valve is in the open position. As best illustrated in FIG. 30, upper flow area 3070 is the cross-sectional area between conical upper wall 3033 of shuttle body 3032 and conical wall 3050 of valve chamber 3048 taken along line 30-30 of FIG. 28. As illustrated in FIG. 29, a lower flow area 3072 is the area between valve seat 3060 of valve body 3002 and the corresponding sealing surface 3062 of shuttle body 3032 when the valve is in the open position. The size of lower flow area 3072 may be increased or decreased by adjusting the length of release ribs 3030 which support valve shuttle 3026 when stop-fill valve 3000 is in the open position. Referring to FIG. 32, a swept surface area 3074 corresponds to the surface area of the conical upper wall 3033 of shuttle body 3032.

It was found that restricting the flow through between shuttle body 3032 and valve seat 3060 by reducing the area of lower flow area 3072 increased the speed at which the valve closed. For example, it was determined that reducing lower flow area 3072 from 0.065 square inches to 0.0445 square inches, a thirty two percent reduction, significantly increased the speed at which the valve closed when tested with water at a differential pressure of about 10 psig. In this example, upper flow area 3070 was increased from about 0.122 square inches to 0.1305 square inches, a seven percent increase and the swept surface area decreased from 0.086 square inches to 0.079 square inches, a decrease of about nine percent.

Thus, in one variation, the ratio of the upper flow area 3070 to the lower flow area 3072 is approximately 1.8 to about 3.5 with the ratio of the swept surface 3074 to the lower flow area 3072 ranging from about 1.3 to about 2.5. In a preferred variation, the ratio of the upper flow area 3070 to the lower flow area 3072 is approximately 2.5 to about 3.0 with the ratio of the swept surface 3074 to the lower flow area 3072 ranging from about 1.5 to about 2.0. Most preferably, the ratio of the upper flow area 3070 to the lower flow area 3072 is approximately 2.9 with the ratio of the swept surface area 3074 to the lower flow area 3072 approximately 1.8.

The drawings and detailed description herein are to be regarded in an illustrative rather than a restrictive manner, and are not intended to limit the following claims to the particular forms and examples disclosed. On the contrary, further modifications, changes, rearrangements, substitutions, alternatives, design choices, and embodiments will be apparent to those of ordinary skill in the art. Thus, it is intended that the following claims be interpreted to embrace all such further modifications, changes, rearrangements, substitutions, alternatives, design choices, and embodiments.

We claim:

1. A combination tank valve apparatus providing fluid flow control, overfill protection, and fluid level gauging for use on a storage tank for liquefied gas, the storage tank having an internally threaded outlet port, the apparatus comprising:
    a service valve having a body defining a tank connection, a valve seat, a valve outlet, and a pair of wrench flats;
        the tank connection having external threads formed thereon adapted for threaded connection into the outlet port of the tank, and defining an internal passage including a throat disposed on a first side of the valve seat and connected to a lower port;
        the valve outlet defining an internal passage disposed on a second side of the valve seat and connected to an outlet port;
        the wrench flats projecting from opposite exterior sides of the body adjacent to the throat to define substantially flat surfaces oriented parallel to one another, at least one of the wrench flats having a pointer magnet recess formed entirely in the flat surface;
    an overfill protection device mounted to the tank connection of the service valve and including a float, a shaft, a overfill valve, and a shaft magnet;
        the float adapted to float at the liquid/gas interface of a liquefied gas in the tank;
        the shaft operably connected to the float to rotate in response to changes in the position of the float and the shaft having an upper portion extending into the throat of the service valve;
        the overfill valve operably connected to the shaft to transition between opened and closed configurations when the shaft rotates into a predetermined position;
        the shaft magnet firmly mounted to the upper portion of the shaft within the throat of the service valve adjacent to the wrench flats to rotate with the shaft about a first axis and having a first magnetic flux field extending therefrom; and
    a dial mounted on the body of the service valve and having a body, a pointer magnet, and a pointer;
        the body having a pointer magnet housing extending therefrom and dimensioned to be received within the pointer magnet recess of the wrench flat;
        the pointer magnet being rotatably mounted in the pointer magnet housing to rotate about a second axis oriented substantially orthogonal to the first axis and having a second magnetic flux field extending therefrom and at least partially overlapping the first magnetic flux field, the first and second magnetic flux fields magnetically coupled to cause rotation of the pointer magnet about the second axis in response to rotation of the shaft magnet about the first axis;
        the pointer being mounted on the pointer magnet to rotate with the pointer magnet and provide a visual indication of the liquid level within the tank.

2. The combination of claim 1, wherein the dial has a spring clamp for attaching to the service valve.

3. The combination of claim 1, wherein the service valve body is substantially constructed of a non-ferrous material.

4. The combination of claim 1, wherein the overfill protection device is substantially constructed of a hydrocarbon-resistant material.

5. The combination of claim 4, wherein the overfill protection device is substantially constructed of plastic.

6. The combination of claim 5, wherein the plastic of the overfill protection device is selected from the group consisting of acetal, nylon and ultem.

7. The combination of claim 1, wherein the dial is removably mounted on the body of the service valve.

8. The combination of claim 1, wherein the dial is permanently mounted on the body of the service valve.

9. The combination of claim 1, wherein the recess in the wrench flat has a depth of approximately 0.2 inches.

10. The combination of claim 1, wherein the recess is substantially circular in section and has a depth of approximately 0.2 inches into a surface of the wrench flat.

11. The combination of claim 1 further comprising:
    a float arm for mounting the float on a first end thereof and
    a counterbalance mounted on the end of the arm opposite the float, wherein the float arm engages the shaft between the float and the counterbalance to rotate in response to changes in position of the float.

12. The combination of claim 11 wherein the float is offset from the longitudinal axis of the float arm.

13. The combination of claim 11 wherein the overfill protection device is configured to direct fluid entering the storage tank away from a longitudinal axis of the shaft.

14. A system for determining a fluid level in a pressurizable container comprising:
    a service valve having a set of wrench flats defining parallel flat surfaces, one of the wrench flats having a recess defined entirely within its flat surface;
    a stop-fill device interconnected with the service valve and operable to rotate a first magnet inside the service valve in proximity to the recess in proportion to the amount of fluid in the pressurizable container; and
    a dial assembly having a dial face and a pointer attached to a second magnet, the second magnet housed in a magnet protrusion on a side of the dial face opposite the pointer and operable to fit into the recess in the service valve such that the dial moves on the dial face proportionately to the degree of rotation of the first magnet inside the service valve.

15. The system of claim 14, wherein the stop-fill device has a shaft geared to a float, the shaft being operational to rotate the first magnet.

16. The system of claim 15, wherein the stop-fill device switches between open and closed states in response to rotation of the shaft.

17. A system for determining a fluid level in a pressurizable container comprising:
    a service valve having a set of wrench flats defining parallel flat surfaces, one of the wrench flats having a first concave feature defined entirely within its flat surface;
    a stop-fill device interconnected with the service valve and operable to rotate a first magnet about a first axis inside the service valve in proximity to the first concave feature in proportion to the amount of fluid in the pressurizable container;
    a magnetic field sensor in a sensor housing interfitting with the first concave feature;

at least one signal wire connected to the magnetic field sensor; and a fluid level display connected to the at least one signal wire to receive electrical signals corresponding to a magnetic field sensed by the magnetic field sensor and provide a fluid level display corresponding to the sensed magnetic field.

18. The system of claim 17, wherein the magnetic field sensor is a two-pole analog magnetic sensor.

19. The system of claim 17, wherein the first magnet rotates about the first axis such that the same field strength and magnetic pole orientation is not provided in proximity to the first concave feature corresponding to more than one fluid level in the pressurizable container.

20. The system of claim 19, wherein the first magnet rotates about the first axis such that a given field strength and magnetic pole orientation is provided in proximity to the first concave feature corresponding to only one fluid level in the pressurizable container.

* * * * *